United States Patent
Afshani

(10) Patent No.: US 11,213,442 B2
(45) Date of Patent: Jan. 4, 2022

(54) MOBILITY APPARATUS

(71) Applicant: BLUE ORCHID CARE INC., Hamilton (CA)

(72) Inventor: Sina Afshani, Hamilton (CA)

(73) Assignee: Blue Orchid Care Inc., Hamilton (CA)

( * ) Notice: Subject to any disclaimer, the term of this patent is extended or adjusted under 35 U.S.C. 154(b) by 112 days.

(21) Appl. No.: 16/346,869

(22) PCT Filed: Nov. 3, 2017

(86) PCT No.: PCT/CA2017/051313
§ 371 (c)(1),
(2) Date: May 1, 2019

(87) PCT Pub. No.: WO2018/081909
PCT Pub. Date: May 11, 2018

(65) Prior Publication Data
US 2019/0254895 A1 Aug. 22, 2019

Related U.S. Application Data

(60) Provisional application No. 62/417,275, filed on Nov. 3, 2016.

(51) Int. Cl.
*A61G 5/14* (2006.01)
*A61G 7/10* (2006.01)
(Continued)

(52) U.S. Cl.
CPC ............. *A61G 5/14* (2013.01); *A61G 7/1017* (2013.01); *A61G 7/1038* (2013.01);
(Continued)

(58) Field of Classification Search
CPC ...... A61G 5/14; A61G 7/1017; A61G 7/1038; A61G 7/1046; A61G 7/1051;
(Continued)

(56) References Cited

U.S. PATENT DOCUMENTS 2,792,052 A * 5/1957 Johannesen .......... A61G 7/1051
297/5
3,397,883 A * 8/1968 Kiehn ...................... A61H 3/04
482/67
(Continued)

FOREIGN PATENT DOCUMENTS

DE 4304757 A1 8/1994
DE 102008049035 A 4/2010
(Continued)

OTHER PUBLICATIONS

PCT International Search Report. PCT/CA2017/051313. dated Jan. 23, 2018.
(Continued)

*Primary Examiner* — David R Hare
*Assistant Examiner* — Alexis Felix Lopez
(74) *Attorney, Agent, or Firm* — Aird & McBurney LP

(57) ABSTRACT

A mobility apparatus having: a base having casters; a handle assembly pivotally attached to the base; a locking mechanism operable to place the handle assembly into a plurality of positions corresponding to an operating mode of the apparatus, and maintain the handle assembly in one of the plurality of positions; an actuating mechanism coupled to the locking mechanism to actuate the locking mechanism; and wherein the locking mechanism comprises: a hub fixedly secured to the base; a hub ring rotatably secured within the hub and comprising attachment means for the handle assembly; a gas spring mechanism coupled to the hub ring to provide a mechanical advantage to assist an operator in lifting a patient; a breaking mechanism for the casters, wherein the breaking mechanism is operable to lock and unlock the casters simultaneously.

19 Claims, 23 Drawing Sheets

(51) Int. Cl.
  *B62B 3/00*  (2006.01)
  *B62B 3/02*  (2006.01)
  *A61H 3/04*  (2006.01)
(52) U.S. Cl.
  CPC ......... *A61G 7/1046* (2013.01); *A61G 7/1051* (2013.01); *A61G 7/1074* (2013.01); *A61H 3/04* (2013.01); *B62B 3/00* (2013.01); *B62B 3/02* (2013.01); *A61H 2003/046* (2013.01); *A61H 2201/0107* (2013.01); *A61H 2201/0192* (2013.01)
(58) Field of Classification Search
  CPC .. A61G 7/1074; A61H 3/04; A61H 2003/046; A61H 2201/0107; A61H 2201/0192; B62B 3/00; B62B 3/02; B62B 3/022; B62B 5/0414; B62B 5/0433; B62B 5/0461; B62B 5/067; B62B 2202/42; B62B 2203/44
  See application file for complete search history.

(56) References Cited

U.S. PATENT DOCUMENTS

| | | | | |
|---|---|---|---|---|
| 7,392,554 | B1* | 7/2008 | Su | A61G 7/1017 5/86.1 |
| 7,921,486 | B2* | 4/2011 | Biersteker | A61G 7/1074 5/87.1 |
| 10,507,152 | B2* | 12/2019 | Afshani | A61H 3/04 |
| 2009/0085317 | A1* | 4/2009 | Livengood | A61M 5/1415 280/79.3 |
| 2011/0101636 | A1* | 5/2011 | Faulhaber | B62B 5/04 280/47.34 |
| 2012/0104710 | A1* | 5/2012 | Liu | A61H 3/04 280/42 |
| 2012/0146301 | A1* | 6/2012 | Horvath | A61G 5/1075 280/47.4 |
| 2013/0113178 | A1* | 5/2013 | Goldish | A61G 5/14 280/250 |
| 2013/0181489 | A1* | 7/2013 | Serhan | B60T 7/14 297/129 |
| 2015/0210114 | A1* | 7/2015 | Spektor | B62B 3/00 16/35 R |
| 2016/0157951 | A1* | 6/2016 | Schoenig | B62B 3/02 280/830 |
| 2017/0165139 | A1* | 6/2017 | Afshani | A61H 3/04 |
| 2018/0014988 | A1* | 1/2018 | Diaz-Flores | A61G 5/04 |
| 2018/0110664 | A1* | 4/2018 | Borisoff | A61G 5/14 |

FOREIGN PATENT DOCUMENTS

| | | |
|---|---|---|
| JP | 2002065766 A | 3/2002 |
| JP | 4885028 B2 | 2/2012 |

OTHER PUBLICATIONS

PCT International Preliminary Report on Patentability. PCT/CA2017/051313. dated Feb. 18, 2019.

* cited by examiner

10

MOBILITY APPARATUS

CLAIM OF PRIORITY

This application is a Section 371 National Stage Application of International Application No. PCT/CA2017/051313, filed on Nov. 3, 2017, which claims priority to U.S. 62/417,275, filed on Nov. 3, 2016, the contents of which are incorporated herein by reference in their entirety.

FIELD OF THE INVENTION

The present invention relates to mobility devices, more particularly it relates to a mobility apparatus for assisting an individual stand from a seated position, or from a standing position to a seated position.

DESCRIPTION OF THE RELATED ART

Inaccurate or improper handling and lifting of an individual by caregivers (either professionals or family member) can put both parties involved at high risk for further injuries, such as falls and musculoskeletal injury. The forward bending required for many individual-lifting and moving activities places the caregiver's spine in a vulnerable position. Even under ideal lifting conditions, the typical weight of any adult far exceeds the lifting capacity of most caregivers, 90 percent of whom are female.

Current products on the market are bulky, cumbersome, and expensive and are not designed for a home setting. For example, hoist floor-based lifts and ceiling-based lifts which lifts the individual with a fabric sling are typically found in institutions are difficult to use, and cause increased individual anxiety and diminished individual safety.

It is an object of the present invention to mitigate or obviate at least one of the above-mentioned disadvantages.

SUMMARY OF THE INVENTION

In one of its aspects, there is provided a mobility apparatus having:
  a base having casters;
  a handle assembly pivotally attached to the base;
  a locking mechanism operable to place the handle assembly into a plurality of positions corresponding to an operating mode of the apparatus, and maintain the handle assembly in one of the plurality of positions;
  an actuating mechanism coupled to the locking mechanism to actuate the locking mechanism; and
  wherein the locking mechanism comprises:
    a hub fixedly secured to the base;
    a hub ring rotatably secured within the hub and comprising attachment means for the handle assembly;
    a gas spring mechanism coupled to the hub ring to provide a mechanical advantage to assist an operator in lifting a patient; and
    a breaking mechanism for the casters, wherein the breaking mechanism is operable to lock and unlock the casters simultaneously.

In another of its aspects, there is provided a mobility apparatus having:
  a base;
  a handle assembly pivotally attached to the base, the handle assembly having at least one handle bar;
  a locking mechanism operable to place the handle assembly into a plurality of positions corresponding to an operating mode of the apparatus, and maintain the handle assembly in the operating mode of the apparatus;
  an actuating mechanism coupled to the locking mechanism to actuate the locking mechanism; and
  wherein with the handle assembly pivoted at an operating angle $\phi$ towards a patient in a seated position with a fixed pivot point formed at the patient's knees, the patient is able to reach and grasp the at least one handle bar by substantially extending the patient's arms, such that the patient's body straightens up on the fixed pivot point.

In another of its aspects, there is provided a method of transferring an individual from a seated position to a standing position, the method having the steps of:
  providing a mobility apparatus having:
    a base;
    a handle assembly pivotally attached to the base;
    a locking mechanism operable to place the handle assembly into a plurality of positions corresponding to an operating mode of the apparatus, and maintain the handle assembly in one of the plurality of positions;
    wherein the plurality of positions correspond to one of a collapsed mode, a loading mode and a transfer mode;
    an actuating lever mechanism coupled to the locking mechanism to actuate the locking mechanism;
    wherein the locking mechanism comprises:
    a hub fixedly secured to the base;
    a hub ring rotatably secured within the hub and comprising attachment means for the handle assembly;
    a gas spring mechanism coupled to the hub ring to provide a mechanical advantage to assist an operator in lifting a patient;
  positioning the individual in front of the apparatus to grasp the handle assembly while seated; and
  pulling the individual from the seated position to the standing position by pulling on the handle assembly to lift the individual along a predetermined upward arc.

In another of its aspects, there is provided a method of transferring an individual from a standing position to a seated position, the method having the steps of:
  providing a mobility apparatus having:
    a base;
    a handle assembly pivotally attached to the base;
    a locking mechanism operable to place the handle assembly into a plurality of positions corresponding to an operating mode of the apparatus, and maintain the handle assembly in one of the plurality of positions;
    an actuating lever mechanism coupled to the locking mechanism to actuate the locking mechanism;
    an actuating mechanism coupled to the locking mechanism to actuate the locking mechanism;
    wherein the locking mechanism comprises:
      a hub fixedly secured to the base;
      a hub ring rotatably secured within the hub and comprising attachment means for the handle assembly;
      a gas spring mechanism coupled to the hub ring to provide a controlled and dampened movement of the handle assembly to assist an operator in transferring a patient from the standing position to the seated position;
  positioning the individual in front of the apparatus to grasp the handle assembly while standing; and
  forcing the individual from the standing position to the seated position by applying a force on the handle assembly to lower the individual along a predetermined downward arc to the seated position.

Advantageously, the mobility apparatus is a manual sit-to-stand transport-assist lift, which enables caregivers to lift and transport individuals who lack strength or mobility to stand on their own. The apparatus allows the lifting of the individual by pulling the individual upward involving a single pull mechanism. Accordingly, the product improves the caregiver experience in areas such as, transfer, positioning, support and lifting. The apparatus is compact, light and portable so the user can carry or store the device near the individual for repeated use and can be collapsed for simple storage. The apparatus provides a much simpler and cost-effective solution for users who do not have access to the bulky and expensive electrical and hydraulic lifts which are not suited for use in a home environment.

BRIEF DESCRIPTION OF THE DRAWINGS

Several exemplary implementations of the present invention will now be described, by way of example only, with reference to the appended drawings in which:

FIG. 15b shows a side view of the mobility apparatus of FIG. 15a;

FIG. 15c shows a front view of the mobility apparatus of FIG. 15a;

FIG. 15d shows a rear view of the mobility apparatus of FIG. 15a;

FIG. 16 shows of a range of motion of a handle assembly of the mobility apparatus of FIG. 15a;

DETAILED DESCRIPTION OF EXEMPLARY IMPLEMENTATIONS

Figure 1:
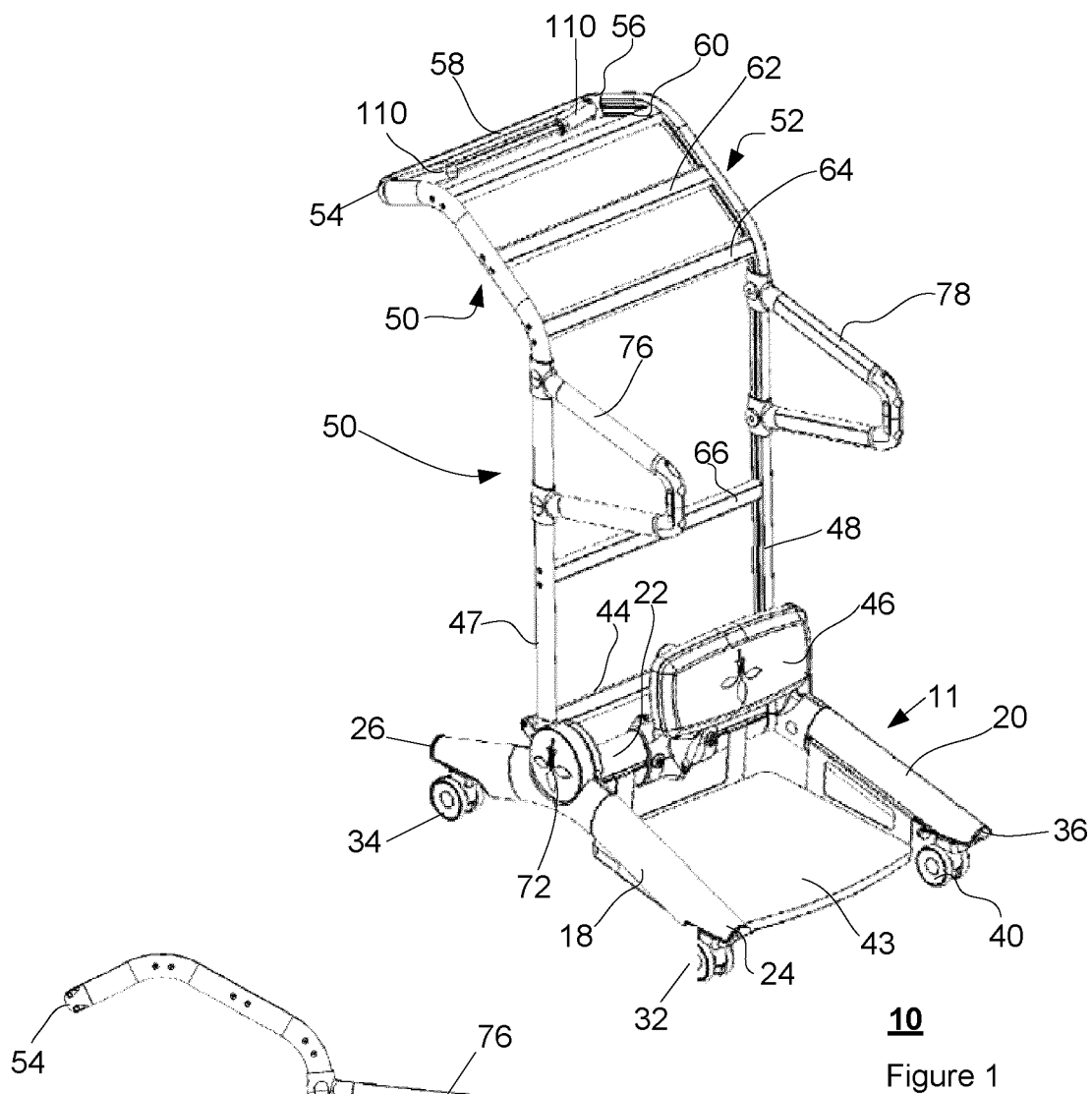
FIG. 1 shows a perspective view of a mobility apparatus, in one exemplary implementation.
Figure 2A:
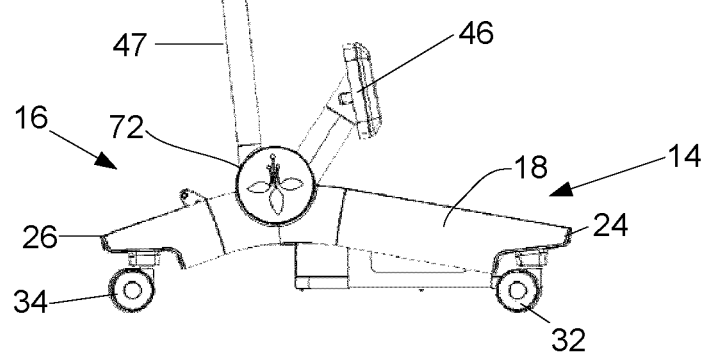
FIG. 2a shows a side view of the mobility apparatus.
Figure 2B:
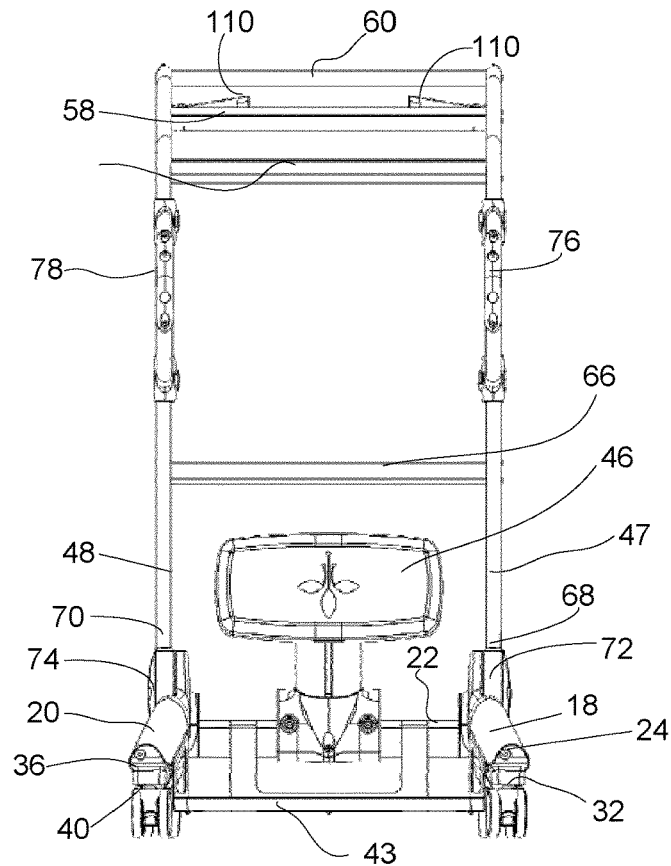
FIG. 2b shows a front view of the mobility apparatus.
Figure 2C:
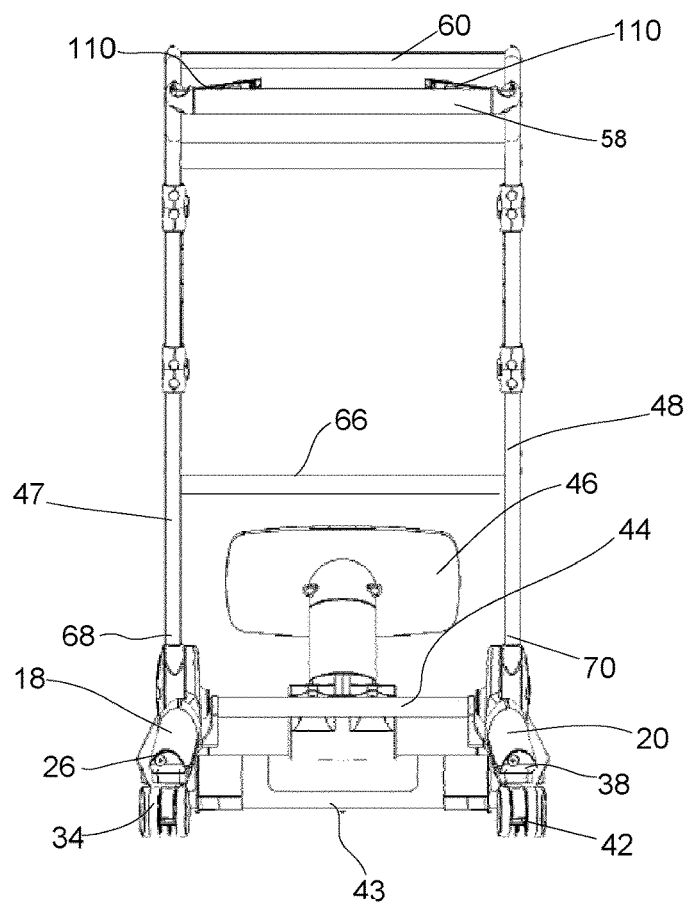
FIG. 2c shows a rear view of the mobility apparatus.

The detailed description of exemplary implementations of the invention herein makes reference to the accompanying block diagrams and schematic diagrams, which show the exemplary implementation by way of illustration. While these exemplary implementations are described in sufficient detail to enable those skilled in the art to practice the invention, it should be understood that other exemplary implementations may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Looking at FIGS. 1 and 2a, 2b and 2c there is shown a mobility apparatus, generally designated by the numeral 10, comprising base 11 and handle assembly 12 pivotally attached thereto. An exemplary use for mobility apparatus 10 is for individuals that require assistance with mobility, such as elderly people, infirmed individuals, rehabilitating individuals, as well as helping the family members and operators lift and transfer these individuals. Base 11 comprises front portion 14 and rear portion 16. Base 11 comprises a pair of oppositely disposed members 18, 20 linked to each other by central linking member 22. Each end 24, 26 of tubular member 18 includes casters 32, 34, and each end 36, 38 of member 20 includes casters 40, 42, respectively. Secured between members 28, 30 and central linking member 22 is platform 43 which allows for an individual to stand on while being lifted from a seated position to a standing position, and vice-versa, as will be explained below. Secured to central linking member 22 is foot brake 44 coupled to central braking mechanism 45 for simultaneous locking and unlocking of all casters 32, 34, 40 and 42, and shin pad 46 is disposed about halfway of the central linking member 22. Shin pad 46 is designed for individuals with bad knees as well as a safety feature for individuals with cognitive disabilities and reduces the likelihood of the individual's body from collapsing into the handle assembly 12 structure in instances where the individual is not able to support their body using their legs.

Figure 3A:
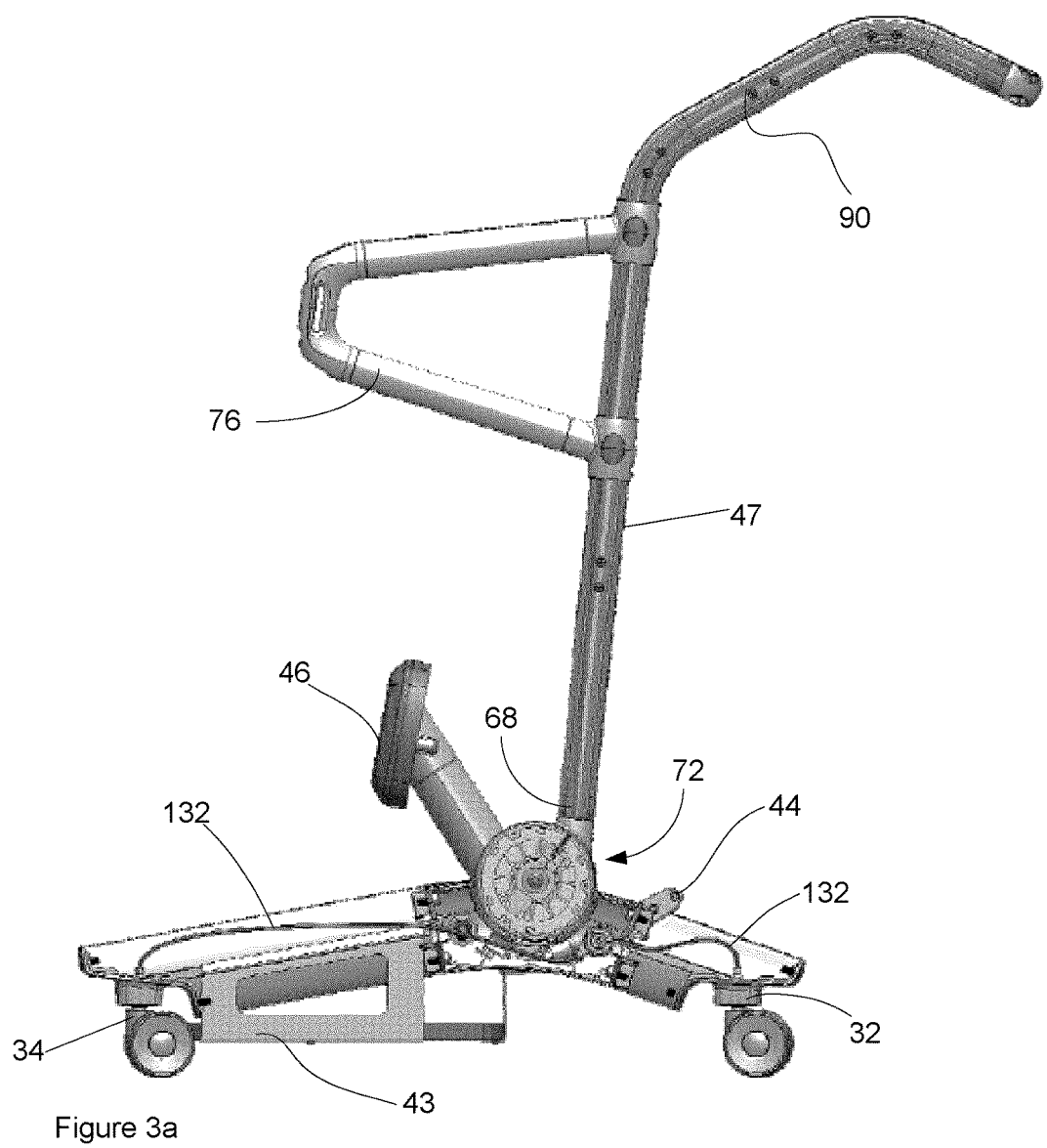
FIG. 3a shows a cutaway view of a handle mechanism and a braking mechanism.
Figure 3B:
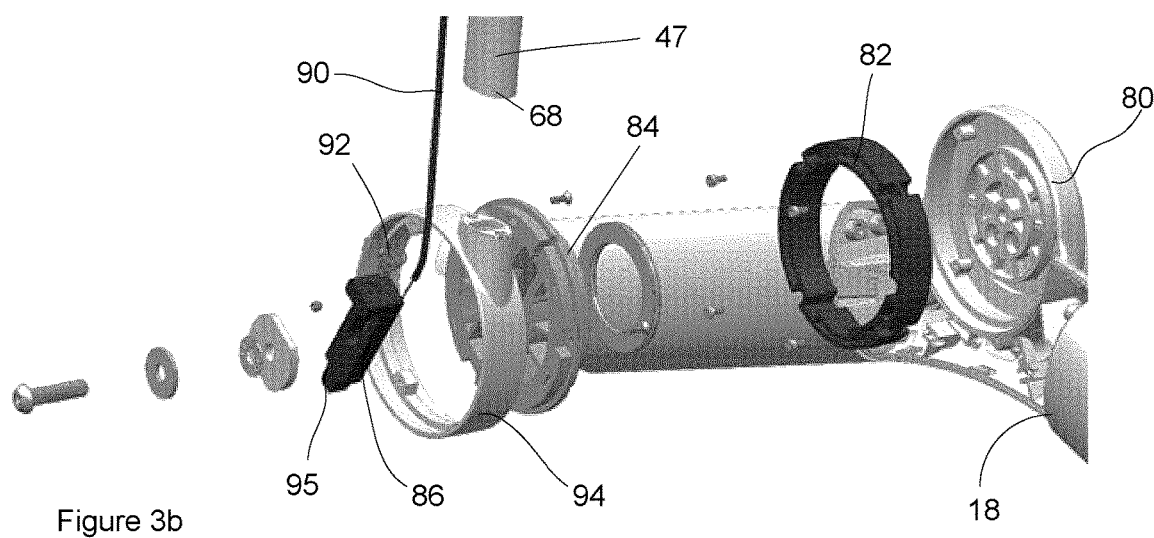
FIG. 3b shows an exploded view of the handle mechanism.

Handle assembly 12 includes a pair of oppositely disposed, elongated members 47, 48, each having an arcuate segment 50, 52 with ends 54, 56 with transverse primary handlebar grip 58, secured therebetween. Additional secondary handlebar grips 60, 62, 64, are secured between arcuate segments 50 and 52, while reinforcing member 66 is connected between elongated members 47, 48 to provide additional rigidity to handle assembly 12. Primary handlebar grip 58 is preferably situated at a height that is comfortable and ergonomically correct for an operator, such as a caregiver, when the operator is in a standing position, as will be described later with reference to FIGS. 5a, 5b and 5c. Also, the positioning of secondary handlebar grips 60, 62, 64 above base 11, and spacing therebetween, is chosen to be facilitate grasping by individuals of various sizes, and varying reach. Ends 68, 70 of elongated members 47, 48 are received by handle mechanism 72, 74 pivotally attached to base 11, to allow limited rotation of handle assembly 12 about base 11, as shown in FIG. 3a. Elongated members 47, 48 further comprise opposed swivable and lockable side supports 76, 78 which provide side support to an individual being assisted. Side supports 76, 78 substantially prevent the individual from falling to either side, and may be used as handles on which the individual pushes on in order to walk with advantage, when platform 44 is removed.

FIG. 3a shows an exploded view of handle mechanism 72 comprising hub 80 fixedly secured to base 11 adjacent central linking member 22, and lock track 82 received and fixedly secured within hub 80. Also part of handle mechanism 72 is lock guide ring 84 rotatably attached to hub 80, and biased sliding lock pin 86 coupled to actuating lever mechanism 88 disposed on arcuate segment 50, 52 of handle assembly 12 by cable 90. Sliding lock pin 86 is biased by resilient member 92, such as a spring. Hub ring 94 receives lock guide ring 84, and is secured thereto, such that hub ring 94 and lock guide ring 84 are caused to rotate in unison about base 11. Hub ring 94 also includes an attachment means for end 68 of elongated member 47 of handle assembly 12, such as an orifice for receiving end 68 of elongated member 47. Therefore, when handle assembly 12 is caused to rotate following actuation of actuating lever mechanism 88, lock guide ring 84, hub ring 94, sliding lock pin 86, spring 92, and lock cable 90 all rotate together while hub 80 and lock track 82 remain in a fixed position on base 11.

Figure 4A:
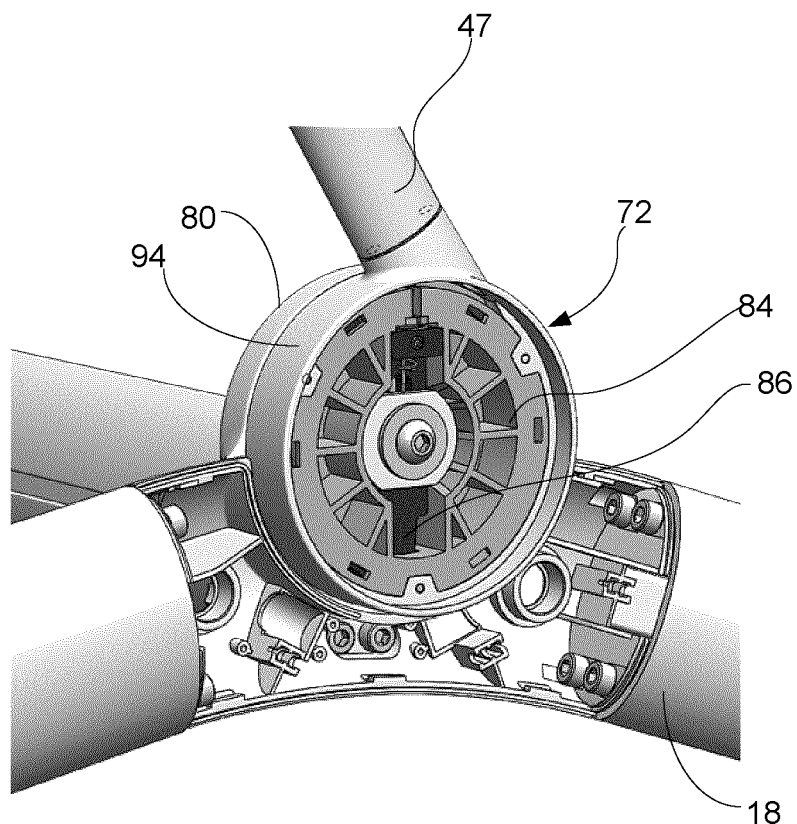
FIG. 4a shows a cutaway view of the handle mechanism when assembled.
Figure 4B:
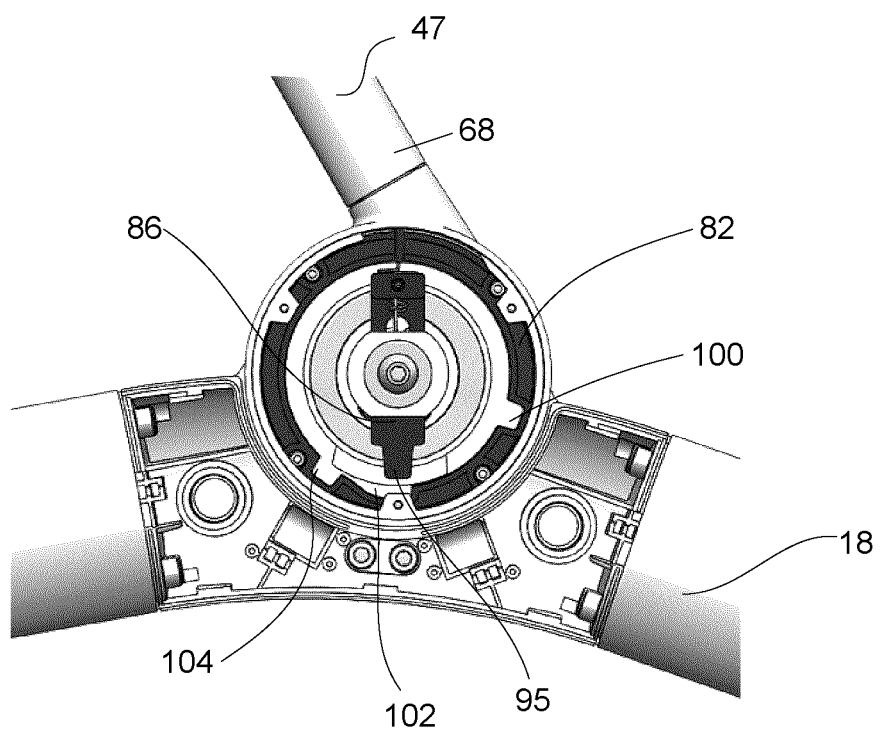
FIG. 4b shows a lock track of the handle mechanism with detent positions corresponding to the various operating modes of the mobility apparatus.

As can be seen in FIGS. 4a and 4b, lock track 82 includes a plurality of detent positions 100, 102, 104 engageable by locking end 95 of sliding lock pin 86 to place handle assembly 12 in a variety of operating modes, such as storage mode, loading mode, and transfer mode. Accordingly, detent position 100 is associated with the collapsed or storage mode, detent position 102 is associated with the loading mode, and detent position 104 is associated with the transfer mode.

Figure 5A:
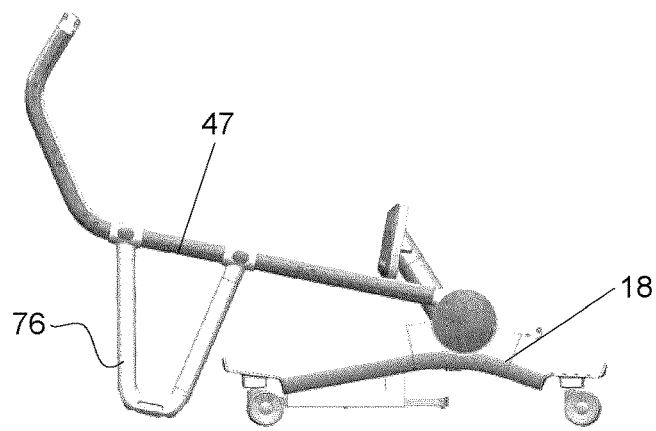
FIG. 5a shows the mobility apparatus in a storage mode.
Figure 5B:
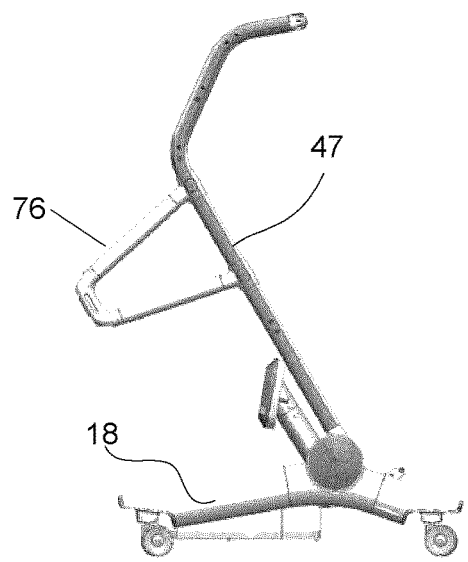
FIG. 5b shows the mobility apparatus in a loading mode.
Figure 5C:
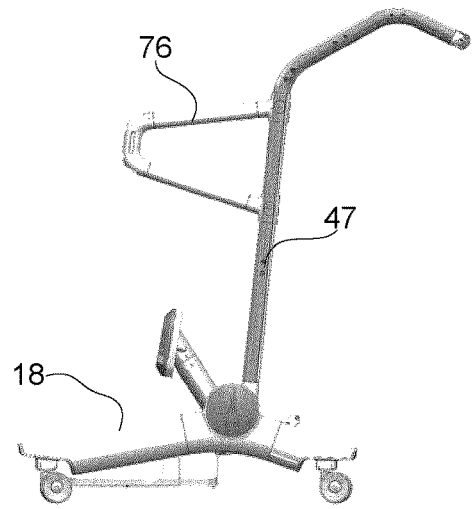
FIG. 5c shows the mobility apparatus in a transfer mode.

As shown in FIGS. 5a, 5b, and 5c, the operating modes are controlled by a handle mechanism 72 coupled to actuating lever mechanism 88 which causes spring-loaded sliding lock pin 86 to engage or disengage one of the detent positions 100, 102 or 104 for a desired operating mode. Handle mechanism 74 comprises identical parts, and therefore the description of handle mechanism 72 herein applies to handle mechanism 74, as both handle mechanism 72 and 74 operate in unison upon actuation of actuating lever mechanism 88.

Figure 6A:
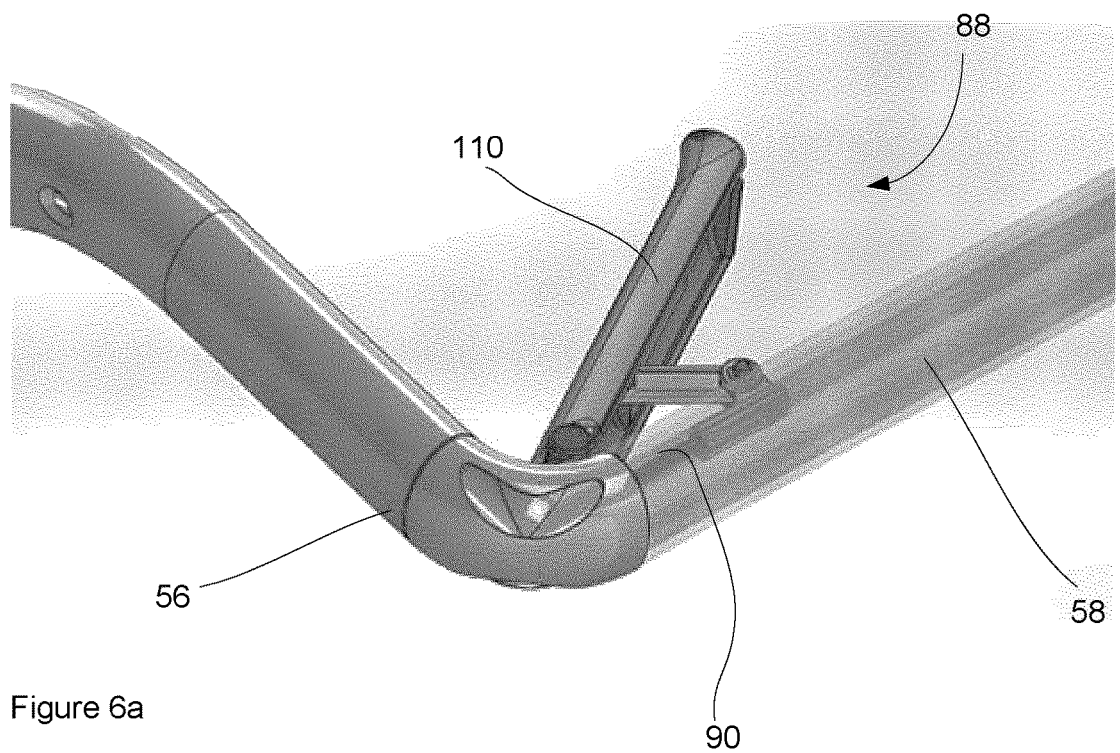
FIG. 6a shows a handle lever mechanism when mobility apparatus is in a storage mode or transfer mode.
Figure 6B:
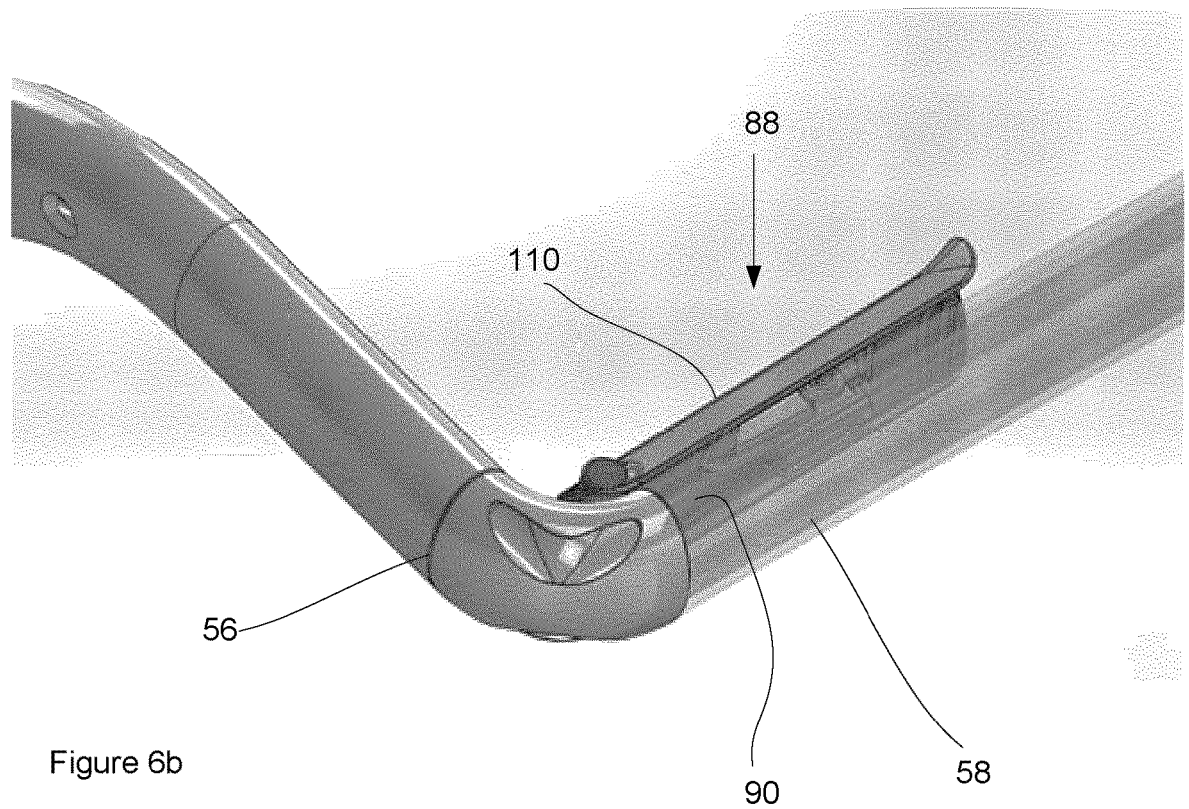
FIG. 6b shows the handle lever mechanism when mobility apparatus is in a loading mode.

Looking at FIGS. 6a and 6b, actuating lever mechanism 88 comprises handle lever 110 hingedly connected to transverse primary handlebar grip 58 and having lock cable 90 extending from sliding lock pin 86 fastened thereto. Generally, handle lever 110 is actuated to apply a tension to cable 90 or release the tension in cable 90. When apparatus 10 is in the storage mode or transfer mode, then sliding lock pin 86 engages detent position 100, and 104, respectively, and handle levers 110, 112 are sprung away from transverse primary handlebar grip 58.

Starting with the apparatus 10 in a collapsed or storage mode, as shown in FIG. 5a, handle assembly 12 is rotated about base 11 pivoting at handle mechanism 72, 74, such that elongated members 47, 48, are adjacent to base 11. In this position, sliding lock pin 86 engages detent position 100, as shown in FIG. 5a.

Figure 7A:
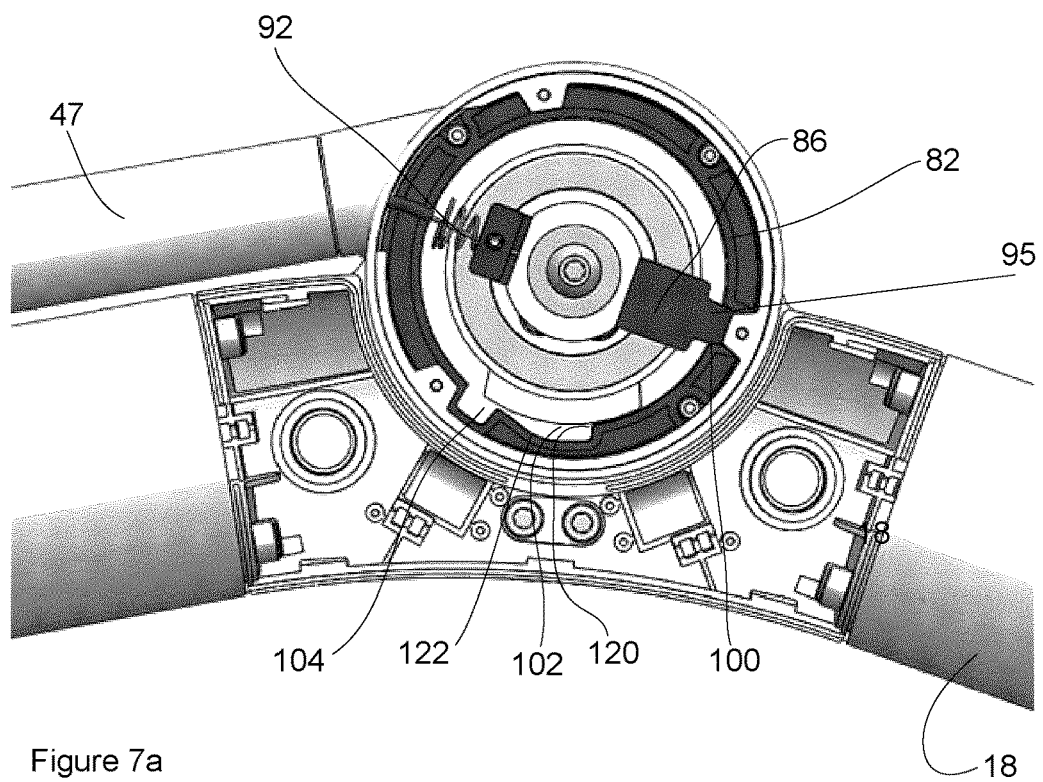
FIG. 7a shows a sliding lock pin in a detent position corresponding to a storage mode.
Figure 7B:
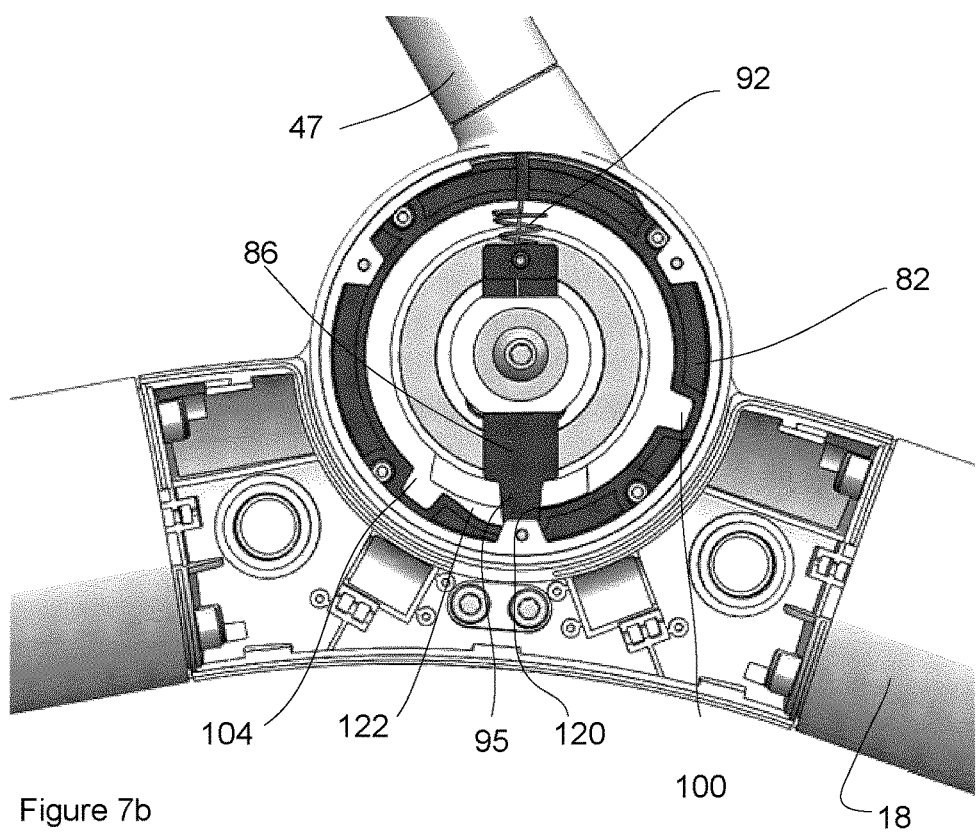
FIG. 7b shows the sliding lock pin in a detent position corresponding to a loading mode.

When an operator wishes to operate apparatus 10 to assist an individual in a seated position to a standing position, operator compresses handle lever 110 which applies tension to a lock cable 90. The tension pulls lock cable 90 and sliding lock pin 86 retracts from detent position 100, pressing up against spring 92 to bias spring 92, which disengages locking end 95 from lock track 82. With locking end 95 now removed from lock track 82, the entire handle assembly 12 is rotated clockwise about hub 80. When handle lever 110 is released, the tension in locking cable 90 is released and spring 92 decompresses and pushes against sliding lock pin 86 and locking end 95 glides on an inner surface of lock track 82 until locking end 95 is forced back into loading detent position 102, and handle assembly 12 is disposed at a loading angle α relative to the ground plane, as shown in FIG. 5b. While in this resting position, an individual is able to grab secondary handlebar grips or rungs 60, 62, 64 from a seated position. As can be seen in FIGS. 7a and 7b, detent position 102 includes a raised shoulder portion 120 and a tapered portion 122, such that locking end 95 abuts shoulder portion 120 to arrest any rotating motion of handle assembly towards the patient, as the individual grabs and pushes down on secondary handlebar grips or rungs 60, 62, 64, as the individual is about to be lifted from the seated position. Accordingly, the engagement of locking end 95 with shoulder portion 120 maintains handle assembly 12 in the loading mode.

Figure 7C:
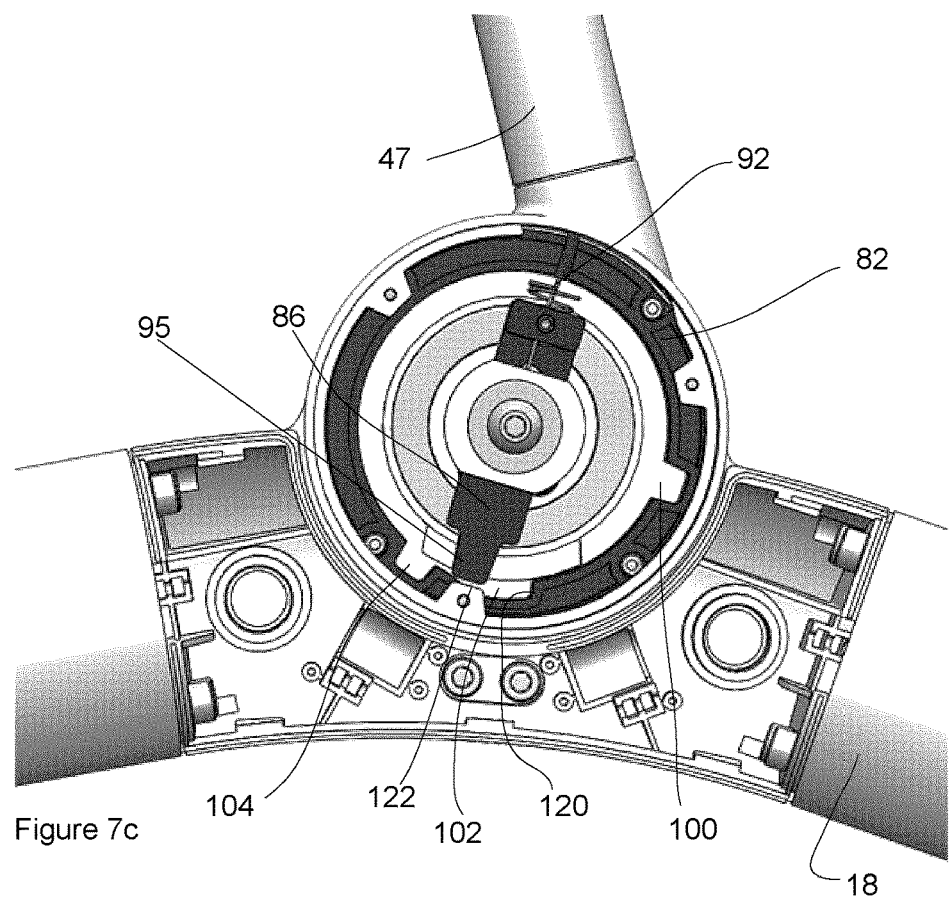
FIG. 7c shows the sliding lock pin on a tapered section of the detent position corresponding to a loading mode.

Once the individual has a firm grip on secondary handlebar grips or rungs 60, 62, 64, the operator the applies pressure to the handle lever 110 which applies tension to the lock cable 90, which translates the sliding lock pin 86 against the compression spring 92 and forces locking end 95 to disengage shoulder portion 120. Once locking end 95 is disengaged from shoulder portion 120, handle lever 110 is released. Next, the operator is able to apply a force on primary handlebar grip 58 to rotate handle assembly 12 away from the individual to lift the individual from a seated position, as locking end 95 glides up on tapered portion 122 of detent position 102 and compresses spring 92, as shown FIG. 7c. Handle assembly 12 is rotated clockwise toward the operator about hub 90 until locking end 85 finds detent position 104 and compression spring 92 forces locking end 85 into detent position 104, thereby resiliently biasing locking end 95 to remain within detent position 104 corresponding to the transfer mode, which allows apparatus 10 to be moved, as shown FIG. 7d.

Figure 7D:
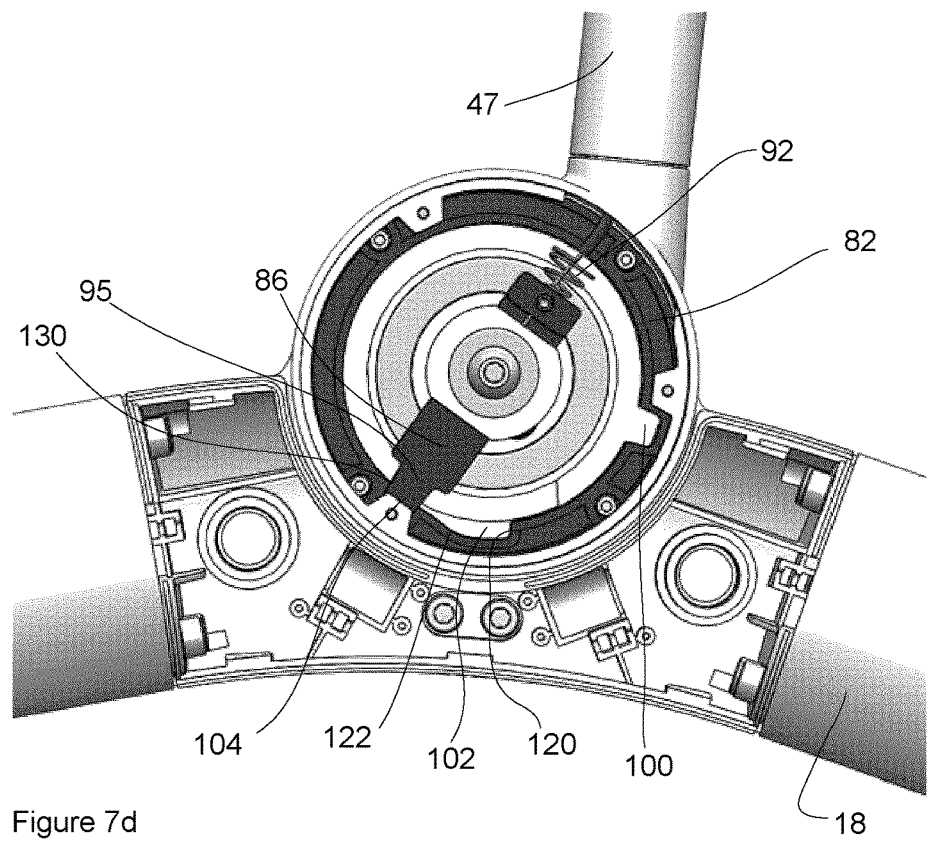
FIG. 7d shows the sliding lock pin in a detent position corresponding to a transfer mode.

A restricting device 130 on the lock track 82 prevents the handle assembly 12 from over-rotating towards the operators. Even if the handle lever 110 is actuated, the sliding lock pin 86 cannot be translated beyond the restricting device 130, as shown in FIG. 7d.

Figure 7E:
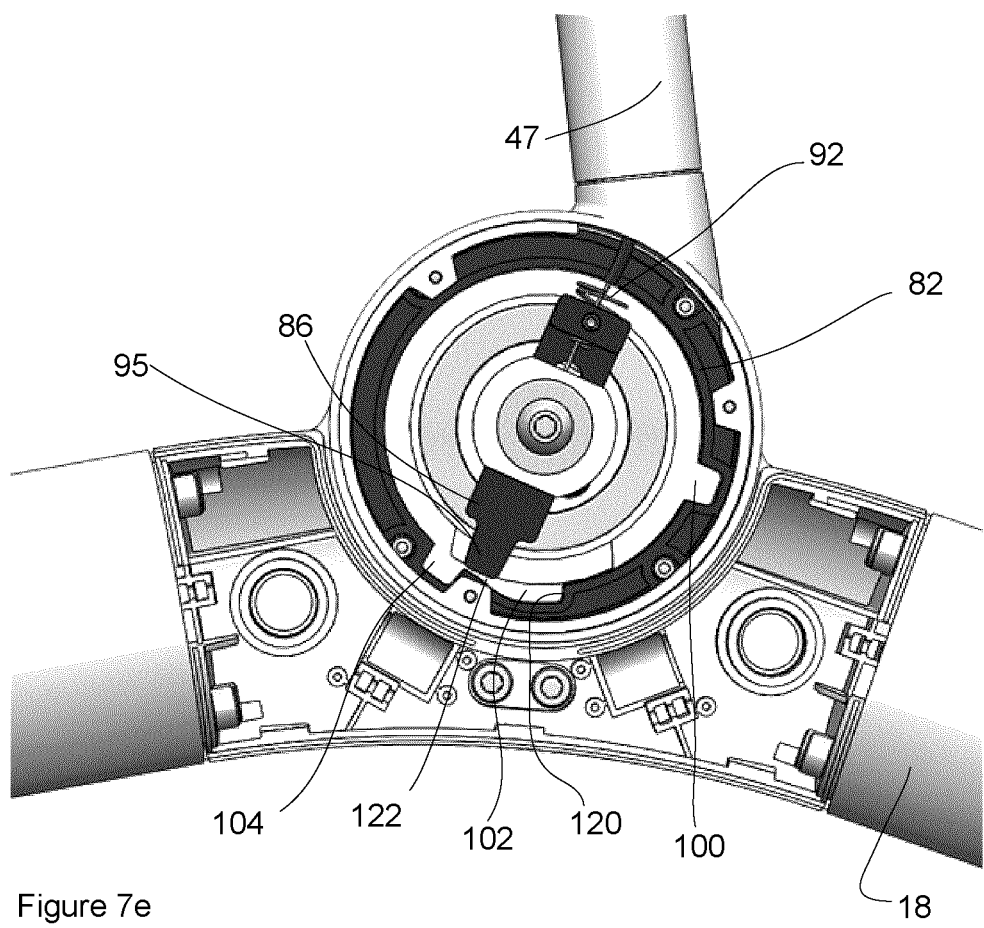
FIG. 7e shows the sliding lock pin after disengaging from the detent position corresponding to a transfer mode to the detent position corresponding to the loading mode.
Figure 8A:
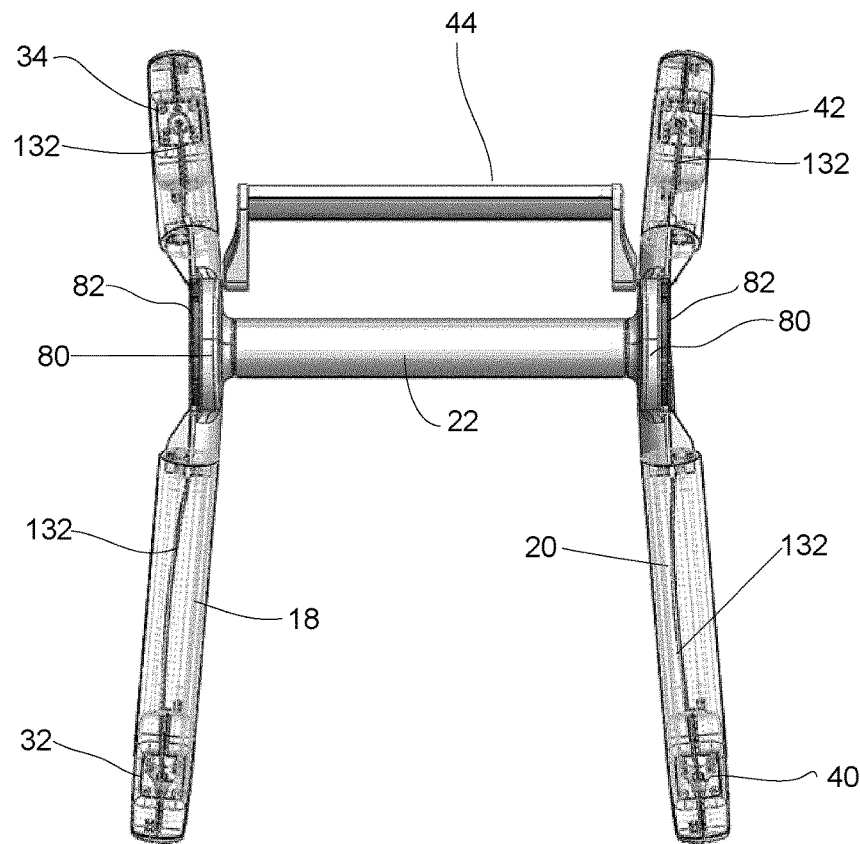
FIGS. 8a and 8b show views of the wheel braking mechanism.
Figure 8B:
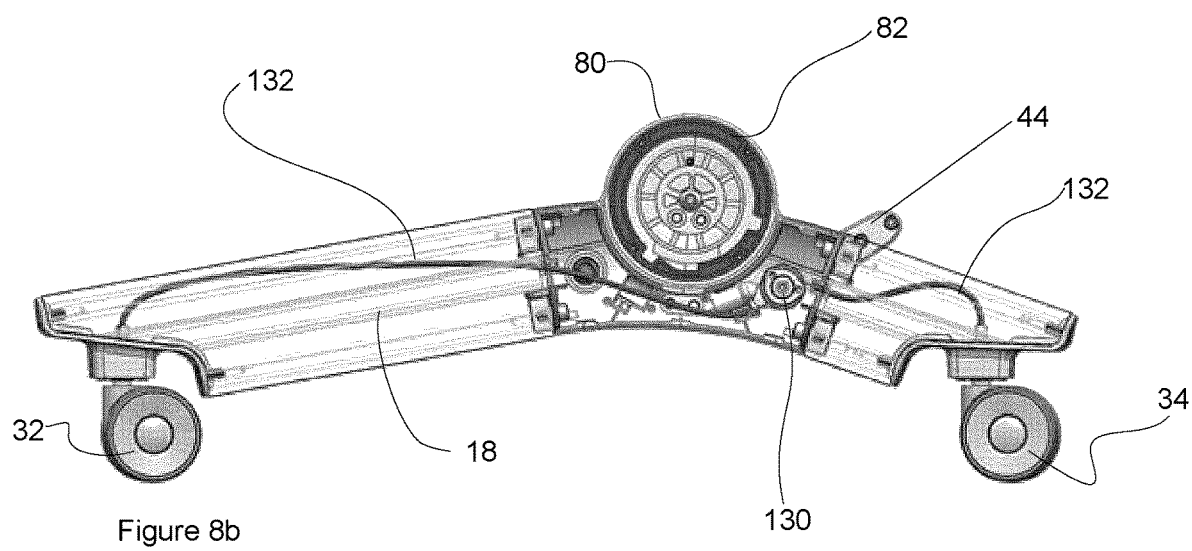

To lower an individual from a standing position, the process is reversed. The handle lever 110 is actuated which applies tension to the cable 90, and causes sliding lock pin 86 against spring 92, thereby forcing locking end 95 out of detent position 104, as shown FIG. 7e. Handle assembly is then rotated anticlockwise towards the individual, and the individual is lowered into a seated position. When the handle lever 112 is released, spring 92 forces sliding lock pin 86 into the loading detent position 102, and locking end 95 glides along tapered portion 122 of detent position 102, until coming to a rest against shoulder portion 120.

Figure 9A:
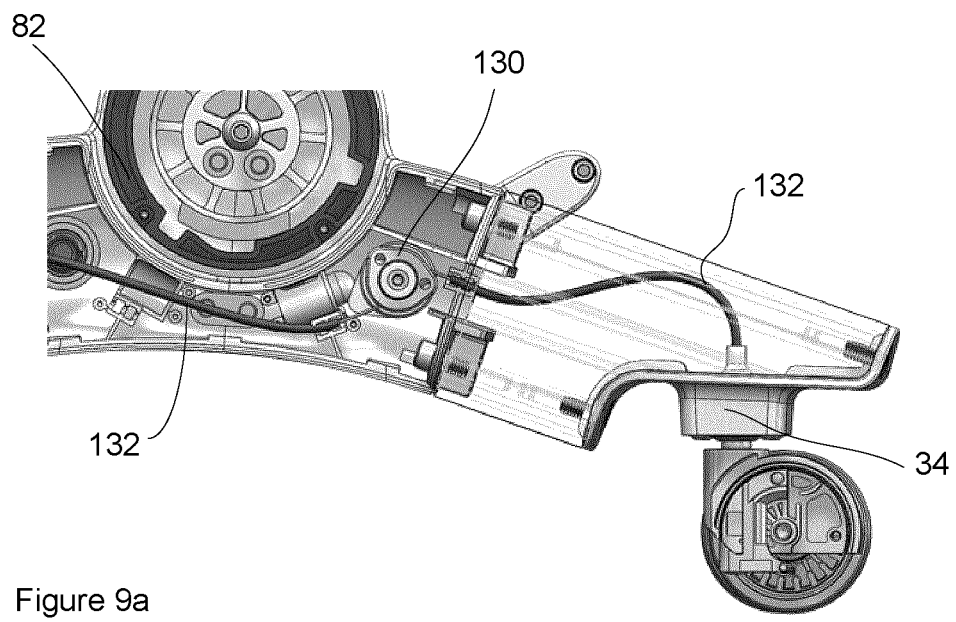
FIGS. 9a and 9b show a braking system for casters.
Figure 9B:
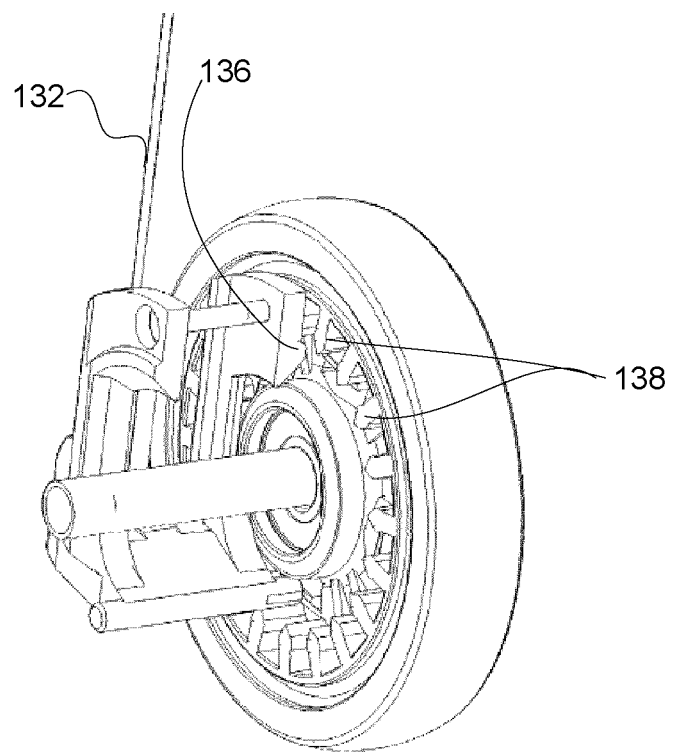

Looking now at FIGS. 9a and 9b there is shown the braking mechanism 45 for caster 32, 34, 40 and 42. Braking mechanism 45 comprises a parallel system consisting of foot brake bar 44 which connects two over centre mechanisms 130 on either side of base 11. Cables 132 connect the over centre mechanisms 130 to the casters 32, 34, 40 and 42 on the base 11. When the foot brake bar 130 is not actuated the apparatus is able to move along a ground plane in a desired direction. In this instance, brake cables 132 are tensioned and maintained in place by the over centre mechanisms 130, compressing the springs in each of the casters 32, 34, 40 and 42 and allowing the apparatus 10 to roll freely in any chosen direction via the operator. To lift or lower an individual after transfer, the operator engages the brake mechanism 45 by pushing the foot brake bar 44 down, thereby releasing the tension in the brake cables 132 and allowing the compression springs to actuate the brake plate 136 in the caster 32, 34, 40 and 42, engaging the teeth 138 and stopping the rotation of the caster wheel. Casters 32, 34, 40 and 42 operate as a dead man's switch, that is, unless the brake cable 134 through the casters 32, 34, 40 and 42 is tensioned, the spring within the caster 32, 34, 40 and 42 maintains the casters 32, 34, 40 and 42 in a locked position by default.

Figure 10A:
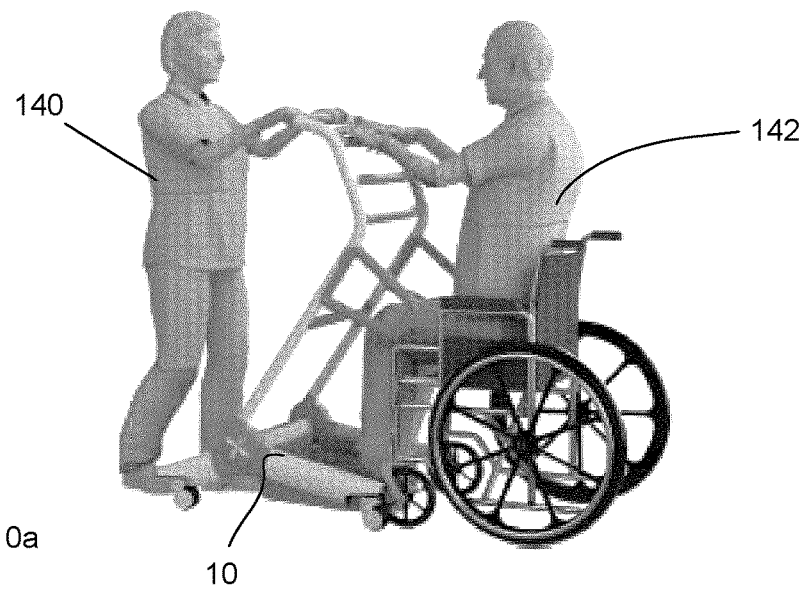
FIGS. 10a to 10c show the mobility apparatus in use for transferring an individual from an initial seated position to a standing position.
Figure 10B:
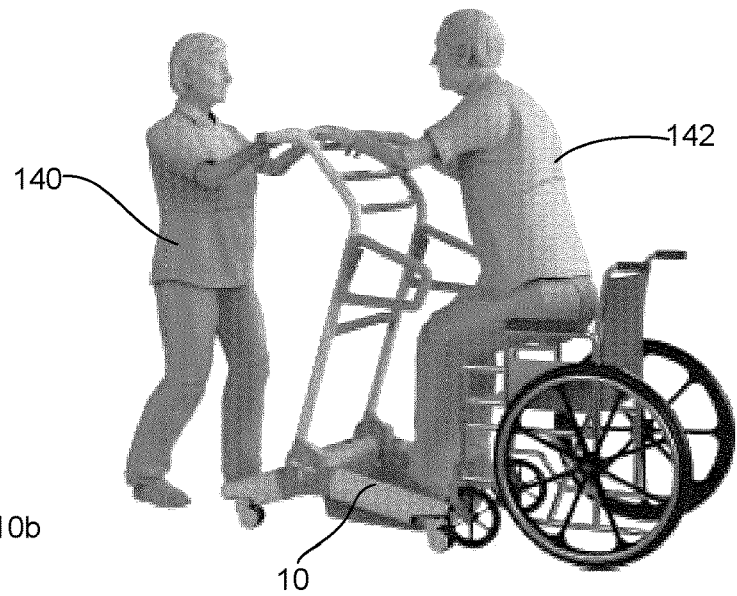
Figure 10C:
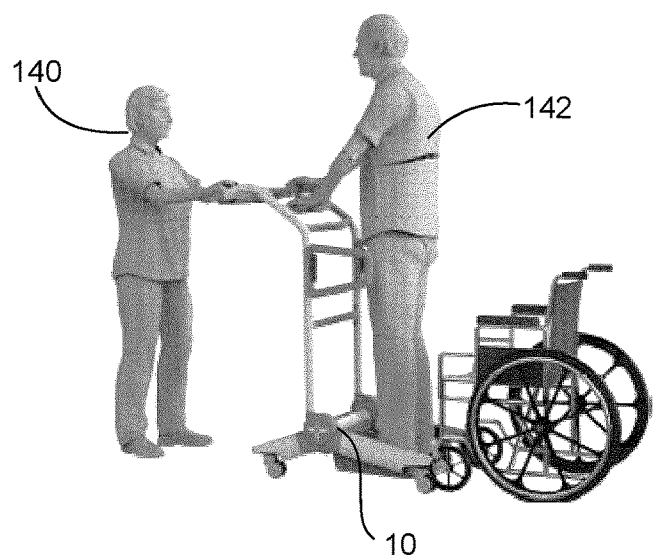
Figures 11A, 11B, 11C:
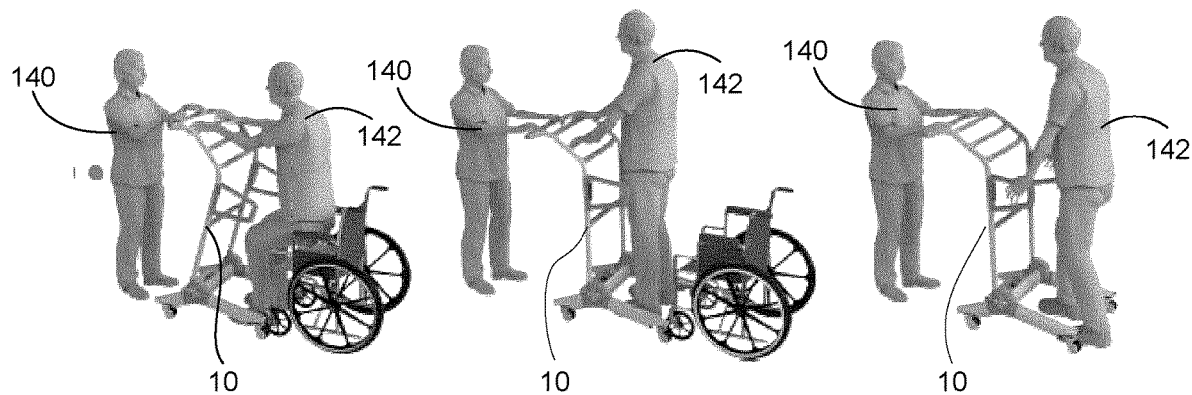
FIGS. 11a to 11c show the mobility apparatus in use for transferring an individual from an initial seated position to a standing position.

FIG. 10a shows apparatus 10 in operation in a loading mode of individual 142 from an initial seated position by operator 140, in one example. Once an assessment of ability of individual 142 with respect to grip strength and stability has been made, operator 140 locks the caster 32, 34, 40 and 42 via central braking mechanism 45, and requests individual 142 to hold on to one of secondary handle grips 60, 62, and 64. Operator 140 then disengages locking mechanism to allow rotation of handle assembly 12. Next, operator 140 informs individual 142 of the intent to lift and transfer individual 142. With individual 142 securely gripping one of secondary handle grips 60, 62, and 64, operator 140 then grasps primary handle grip 47 and pulls handle assembly 14 away from individual 142, as shown in FIG. 10b. Operator 140 continues pulling on handle assembly 14 in a clockwise direction, and handle assembly 12 rotates until sliding lock pin 86 engages detent position 104 to place handle assembly 14 in a transfer mode, as shown in FIG. 10c.

Figures 12A, 12B, 12C:
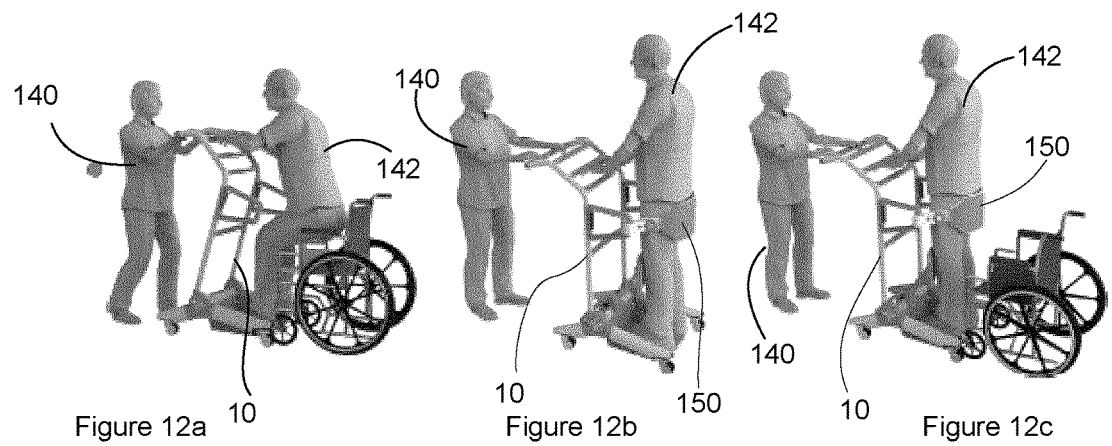
FIGS. 12a to 12c show the mobility apparatus in use for transferring an individual with an auxiliary support system from an initial seated position to a standing position.
Figures 13A, 13B, 13C:
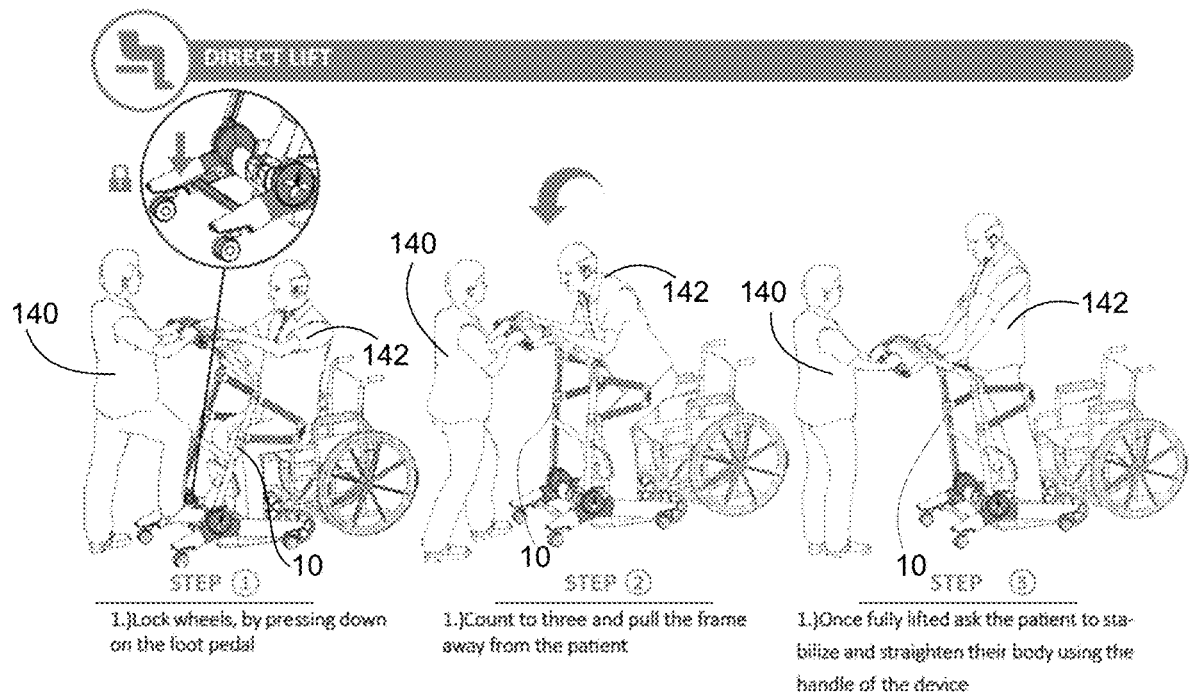
FIGS. 13a to 13c show the method steps for transferring an individual from an initial seated position to a standing position.
Figures 14A, 14B, 14C:
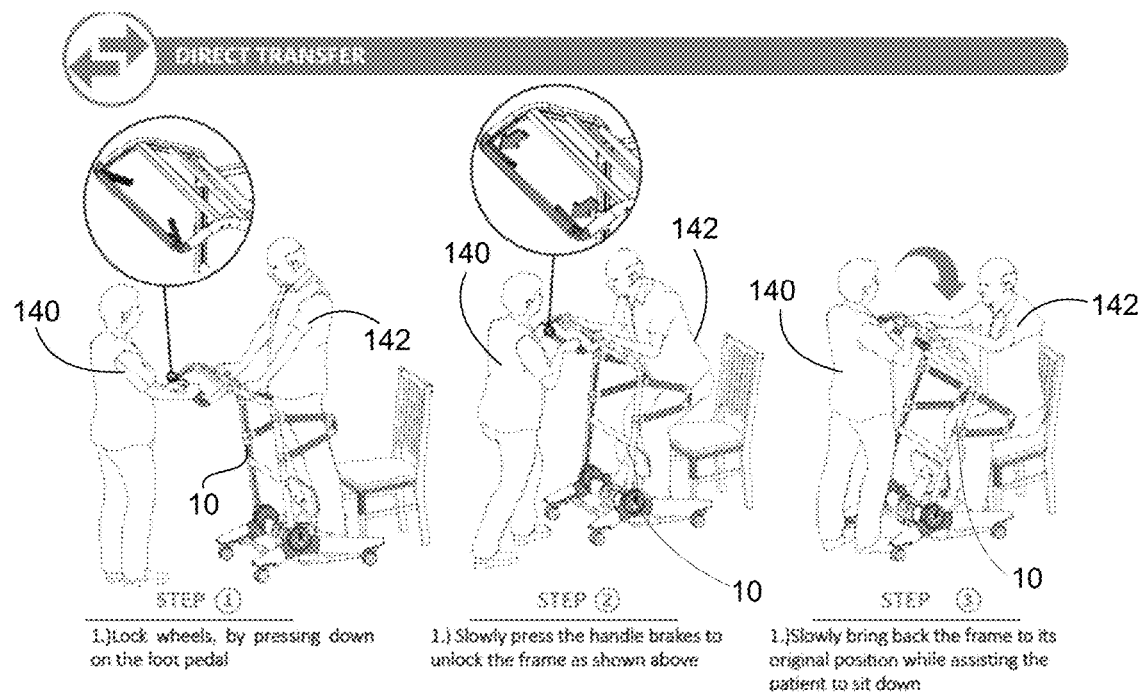
FIGS. 14a to 14c show the mobility apparatus the method steps for transferring an individual from an initial standing position to a seated position.
Figure 15A:
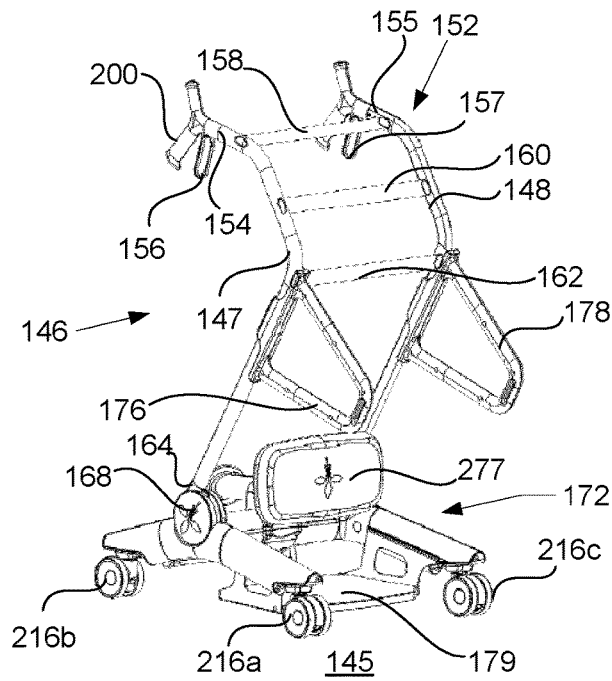
FIG. 15a shows a perspective view of a mobility apparatus, in another exemplary implementation.
Figure 15B:
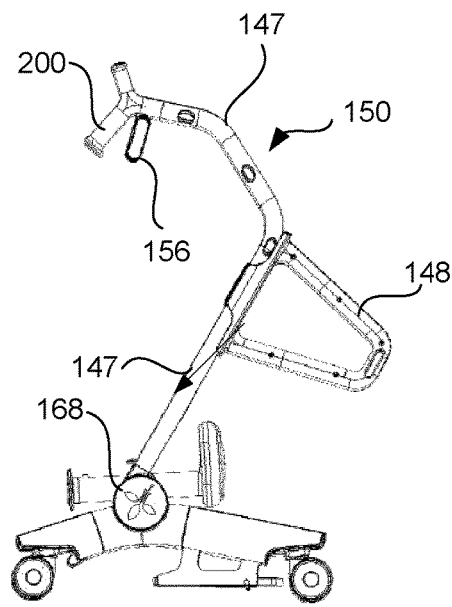
Figure 15C:
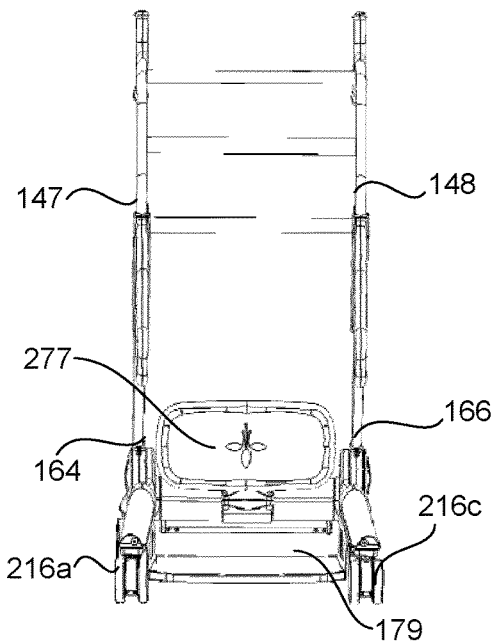
Figure 15D:
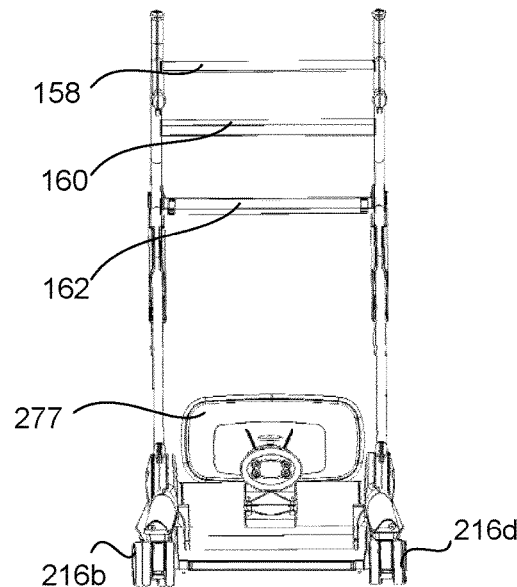

FIGS. 11a to 11c, and 12a to 12c show the mobility apparatus 10 in use for transferring individual 142 from an initial standing position to a seated position, or vice versa by operator 140. Once individual 142 is brought to the desired location, operator 140 unlock locking mechanism and gently guide the individual 142 and lower the frame assembly 14 back to its loading mode. Accordingly, apparatus 10 allows an operator or operator 140 to lift and transfer individual within a given setting, such as a home environment, hospital or assisted-living facility. For example, operator 140 may operate apparatus 10 to lift, move or transfer individual 142 that needs assistance, e.g. from a bed to a wheelchair or walker, or from a wheelchair to a walker, toilet, or any other transfer situation. FIGS. 13a to 13c show the method steps for transferring an individual 142 from an initial seated position to a standing position; and FIGS. 14a to 14c show the method steps for transferring an individual 142 from an initial standing position to a seated position, or vice versa.

In another exemplary implementation, each of pair of oppositely disposed, elongated members 47, 48 is telescoping for length adjustment to suit the height of individual 142 and/or operator 140.

In another exemplary implementation, the arms of arcuate members 50, 52 are telescoping to permit height adjustment of apparatus 10 to suit individual 142 and/or operator 140.

In another exemplary implementation, platform 43 is releasably attached to base 11, thereby enabling ambulatory motion by individual 142 using apparatus 10.

In another exemplary implementation, there is provided an auxiliary supporting system 150 for an individual, such as a belt strap placed behind an individual's torso and having one end releasably attached to elongated tubular member 47, and another end releasably attached to elongated tubular member 48. The auxiliary supporting system may include a plurality of belts or bands for supporting the waist, hips and upper part of the legs of the individual, as shown in FIGS. 12b and 12c. The belt or band 150 impedes individual 142 from falling backwards when rising from a seated position or descending into a seated position. The belt or band 150 may be adjustable to suit various body shapes and sizes.

In another exemplary implementation, base 11 comprises a counterweight to provide additional stability to apparatus 10, and hence individual 142 during raising and standing.

In another exemplary implementation, apparatus 10 includes at least one of an arcuate member 50, 52, elongate member 47, 48, and base 11 structural members formed of aluminum, steel or plastic.

In another exemplary implementation, apparatus 10 includes at least one of an arcuate member 50, 52, elongate member 47, 48, and base 11 structural members formed of aluminum, steel or plastic formed of tubular structural members.

In another exemplary implementation, base 11 includes wheels operable for braking by a braking mechanism.

In order to improve the posture of the individual 142 while being lifted, the arms are at a 20 to 30 degree angle theta (Θ). This allows the body travels at an upward arc instead of merely bending at the center of the body, as the horizontal arms will only cause the body to bend at the center and be pulled horizontally. Creating an upward angle with arms relative to the center of the body allows the apparatus 10 to be used to pull the individual 142 upward. The overall height of the apparatus 10, and various handle locations are designed to facilitate the upward position of the individual 142's arms for a range of individual body sizes.

During the lifting process the individual is seated upward at about 90 degrees while the feet (ankles) are also at a 90 degree angle relative to base 11.

In order to improve the posture of individual the apparatus 10 is designed to lift individual 142 at an upward arc. The arc is created by the central pivot or lever indicates the direction that individual 142 will travel. By extending the bar away from the pivot point the initial arc is upward instead downward, since if operator 140 starts to pull the individual 142 at a downward arc then the body of individual 142 would only bend and not move.

Figure 16:
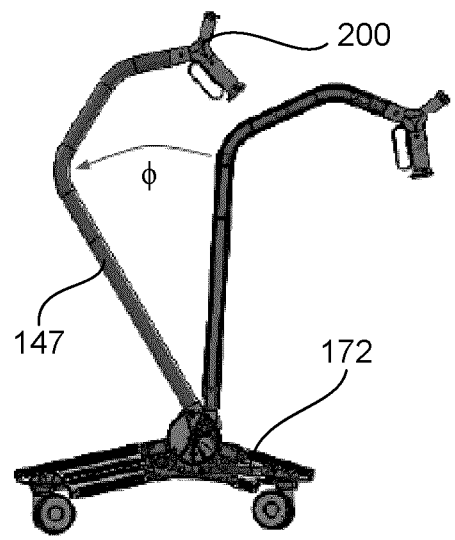

FIGS. 15a to 15f show a mobility apparatus 145 in another exemplary implementation. Similar to mobility apparatus 10, handle assembly 146 includes a pair of oppositely disposed, elongated members 147, 148, each having an arcuate segment 150, 152 with ends 154, 155 with actuating mechanism 156, 157. Secured between elongated members 147, 148 are transverse primary handlebar grip 158, and secondary handlebar grips 160, 162. Primary handlebar grip 158 is preferably situated at a height that is comfortable and ergonomically correct for an operator, such as a caregiver, when the operator is in a standing position, as will be described later with reference to FIGS. 24a, 24b and 24c. Also, the positioning of secondary handlebar grips 160, 162, and spacing therebetween, is chosen to be facilitate grasping by individuals of various sizes, and varying reach. Ends 164, 166 of elongated members 147, 148 are received by handle mechanism 168, 170 pivotally attached to base 172, to allow limited rotation of handle assembly 146 about base 172, e.g. by angle ϕ, as shown in FIG. 16. In one example, the angle of rotation ϕ is 35 degrees. Elongated members 147, 148 further comprise opposed swivable and lockable side supports 176, 178 which provide side support to an individual being assisted. Side supports 176, 178 substantially prevent the individual from falling to either side, and may be used as handles on which the individual pushes on in order to walk with apparatus 145, when platform 179 of base 172 is removed.

Figure 17A:
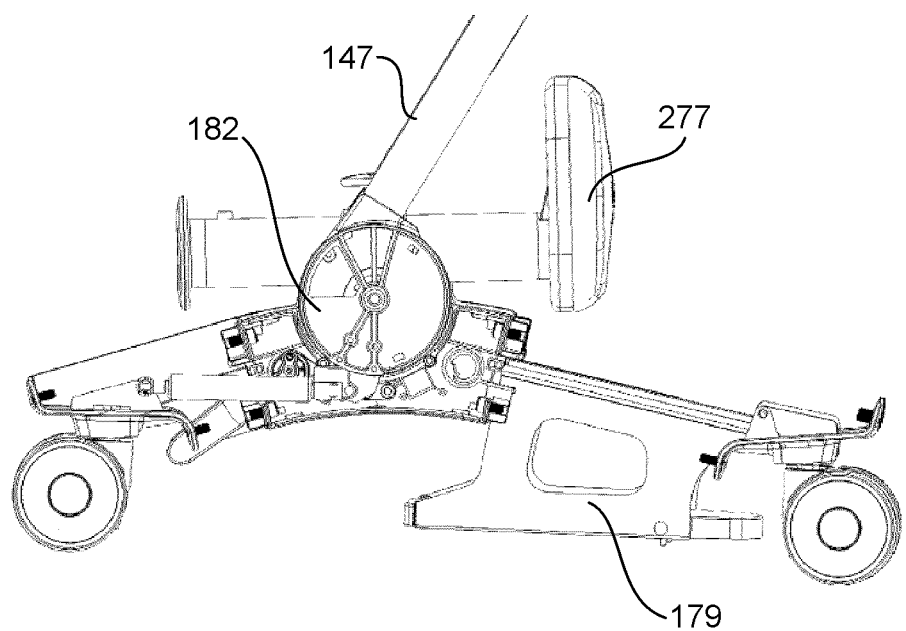
FIGS. 17a-d show views of a handle mechanism.
Figure 17B:
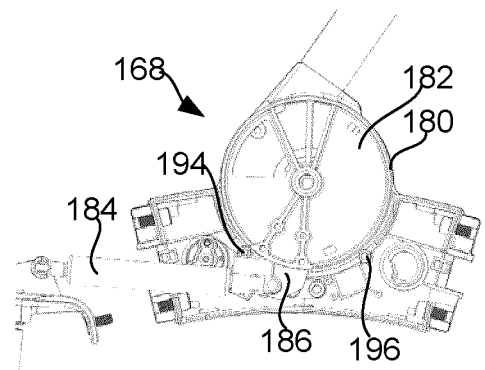
Figure 17C:
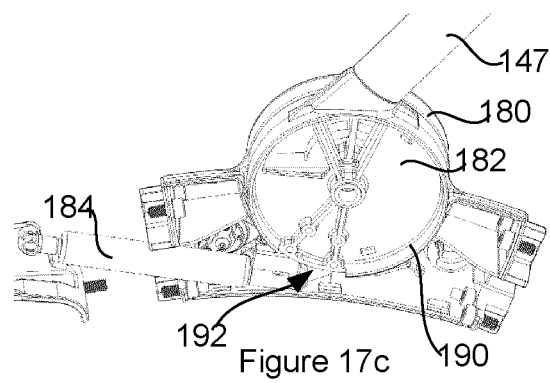
Figure 17D:
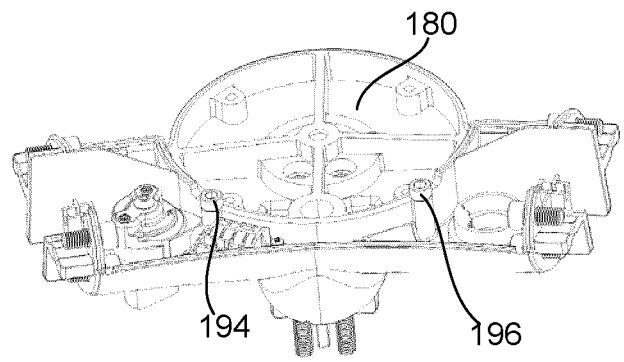

FIGS. 17a-c show a view of handle mechanism 168 comprising hub 180 fixedly secured to base 172 and hub ring 182 rotatably attached to hub 180 with a limited range of motion. Handle mechanism 170 comprises identical parts, and therefore the description of handle mechanism 168 herein applies to handle mechanism 170, as both handle mechanism 168 and 170 operate in unison upon actuation of actuating mechanism 156, 157. Coupled to hub ring 182 is gas spring mechanism 184 via bracket 186. Gas spring mechanism 184 is mounted on front portion of base 172 and provides a mechanical advantage to assist an operator in lifting a patient from a seated position to a standing position. Alternatively, gas spring mechanism 184 provides a controlled and dampened movement of handle assembly 146 to assist an operator in transferring a patient from a standing position to a seated position.

As can be seen in FIG. 17b, hub ring 182 comprises annular flange 190 with a gap 192 defined therein. Hub 180 comprises lock bolts 194, 196 which are received by gap 192 for limiting the range of motion of hub ring 182 during operation of apparatus 150. Hub ring 182 also includes an attachment means for end 164 of elongated member 147 of handle assembly 12, such as an orifice for receiving end 164. Therefore, when handle assembly 12 is caused to rotate following actuation of actuating mechanism 156, hub ring 182 rotates too.

Figure 18A:
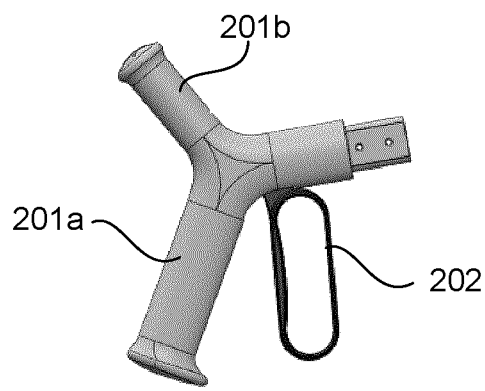
FIGS. 18a-c show views of an actuating mechanism.
Figure 18B:
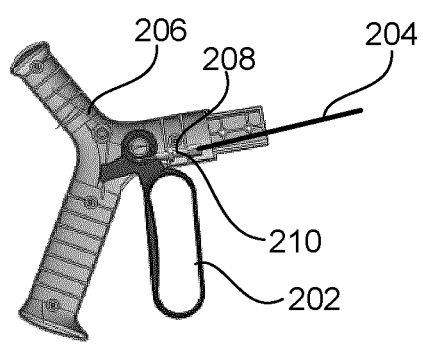
Figure 18C:
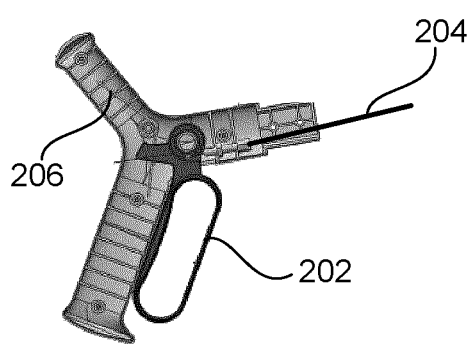

Actuating mechanism 157 comprises identical parts, and therefore the description of handle mechanism 156 herein applies to actuating mechanism 157, as both actuating mechanism 156, 157 operate in unison to cause rotation of hub rings 182. Looking at FIGS. 18a-c, actuating mechanism 156 comprises grip handle 200 with lower handle portion 201a and upper handle portion 201b, and lever 202 coupled to gas spring actuating cable 204 linked to gas spring mechanism 184. Actuating mechanism 156 allows placement of apparatus 150 between a plurality of positions, such as loading, transfer and storage. Lever 202 is rotatable within grip handle 200 and includes spring means 206 which resiliently biases lever 202 in a non-actuating position. Gas spring actuating cable 204 is fed through push-pull cable fitting 208 with ball bearing valve 210. In a rest position, as shown in FIG. 18b, ball bearing valve 210 locks gas spring mechanism 184 anytime lever 202 is not squeezed. In FIG. 18c, urging lever 202 toward lower handle portion 201a places lever in an actuating position, and therefore squeezing lever 202 pulls gas spring actuating cable 204 and unlocks the gas spring mechanism 206 to cause rotation of hub ring 182, to permit placement of apparatus in multiple operating modes.

Figure 19A:
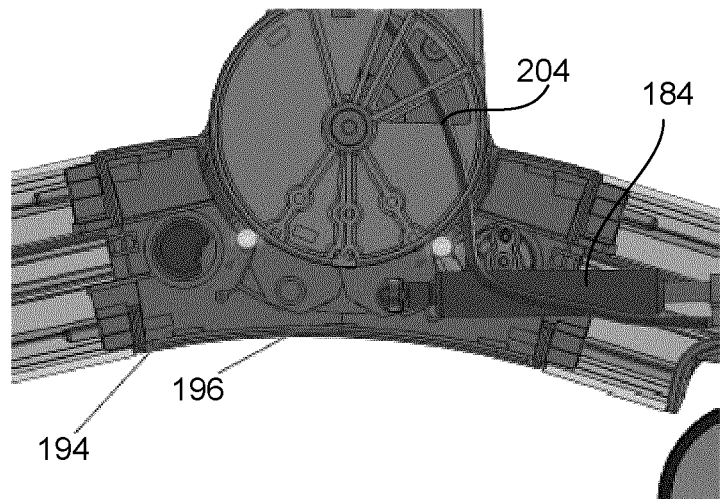
FIGS. 19a-c show views of a gas spring mechanism in operation.
Figure 19B:
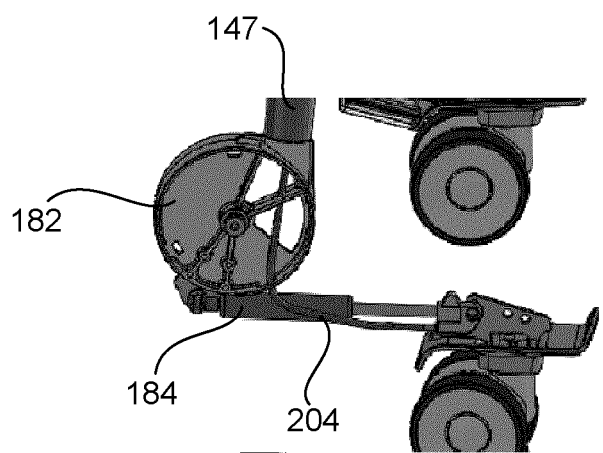
Figure 19C:
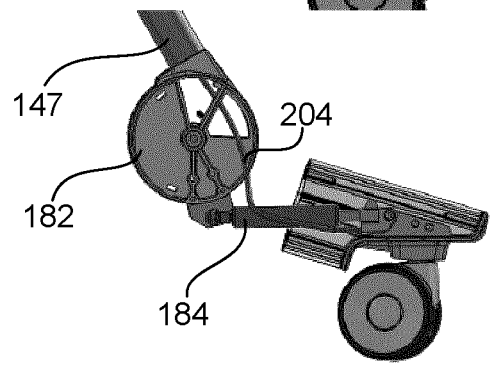

In FIG. 19a, with gas spring mechanism 184 unlocked, hub ring 182 is free to rotate about hub 180, however, the range of motion of hub ring 182 is limited by lock bolts 194, 196. For example, handle mechanism 168 and 170 pivots through 35 degrees to assist the patient from sitting to standing position. In FIG. 19b, gas spring mechanism 184 is locked and maintains handle assembly 146 in a desired position, such as a vertical position. In FIG. 19c, gas spring mechanism 184 is locked and maintains handle assembly 146 in another desired position, such as a loading/unloading position. Accordingly, the locking feature of gas spring mechanism 184 allows for placement of handle assembly 146 in a plurality of positions within the limited range of motion, with the positions being associated with a variety of operating modes, such as storage mode, loading mode, and transfer mode, as described above.

Figure 20A:
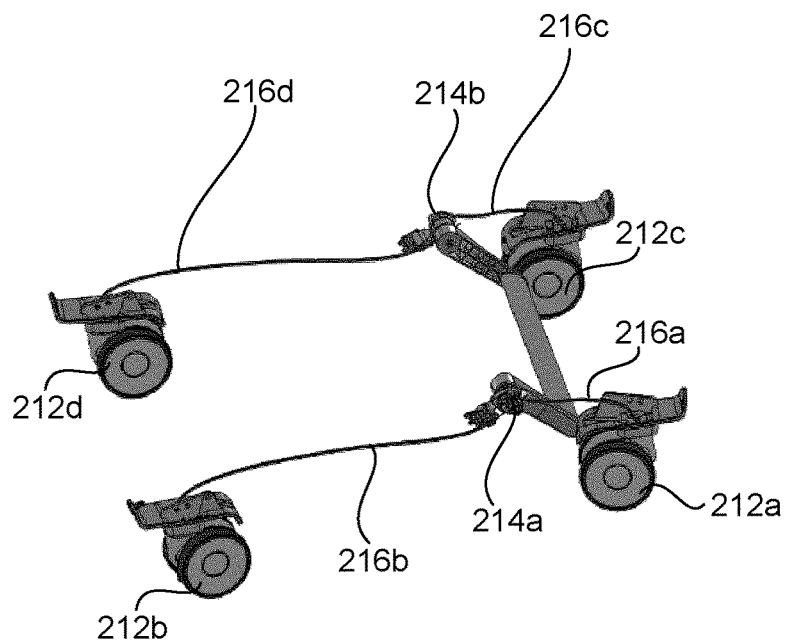
FIGS. 20a-c show views of a braking system for casters.
Figure 20B:
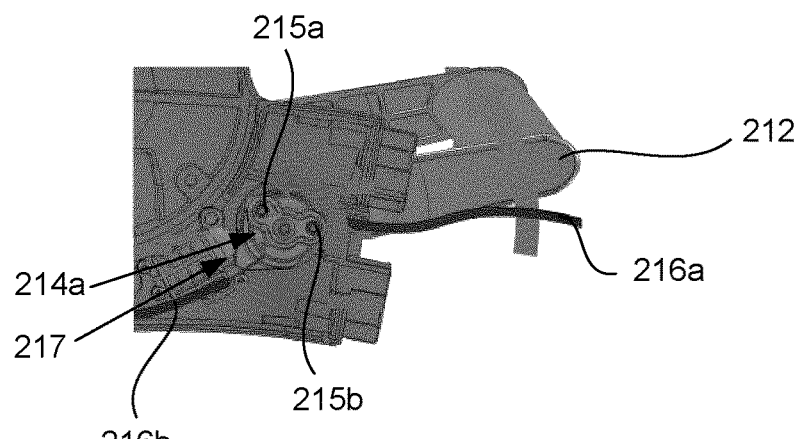
Figure 20C:
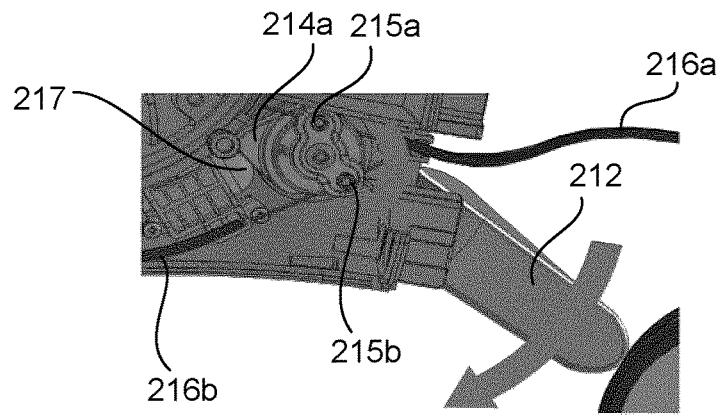

Looking now at FIGS. 20a-c there is shown a braking mechanism 210 for caster assemblies 212a-d. Braking mechanism 210 comprises foot pedal 212 operable between two positions, and coupled to cam 214a, 214b and to cause limited rotation of same. Brake cable 216a connects caster assembly 212a to cam 214a via cable anchor 215a, and brake cable 216b connects caster assembly 212b to cam 214a via cable anchor 215b. Brake cable 216c connects caster assembly 212c to cam 214b via cable anchor 215c, and brake cable 216d connects caster assembly 212d to cam 214b via cable anchor 215d. The two position foot operated lever 212 activates cables 216a-d which engages and disengages the brakes on all four caster assemblies 212a-d simultaneously. Generally, caster assemblies 212a-d are fitted with brakes which are engaged by default.

Looking at FIG. 20b, in the default position, foot pedal 212 is depressed such that cam 214 rotates past plunger 217, thereby loosening brake cables 212a, b to engage the brake. Meanwhile, in FIG. 20c, foot pedal 212 is lifted up such that cam 214 rotates past plunger 217, thereby tightening brake cables 212a, b to disengage the brake.

Figure 21A:
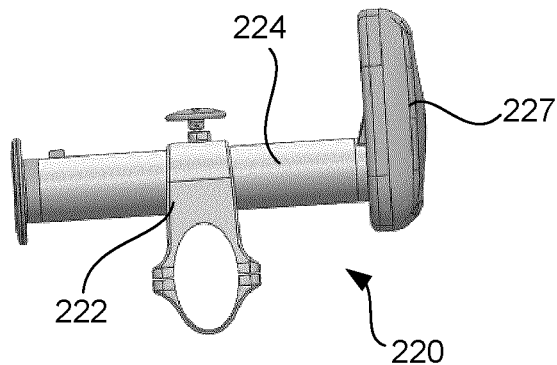
FIGS. 21a-d show views of a shin pad assembly.
Figure 21B:
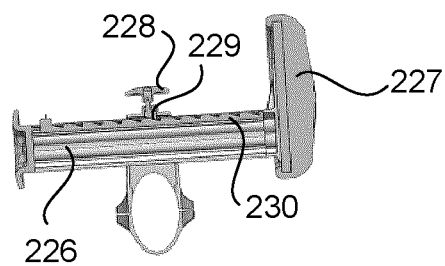
Figure 21C:
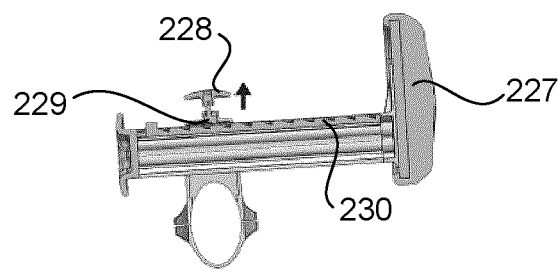
Figure 21D:
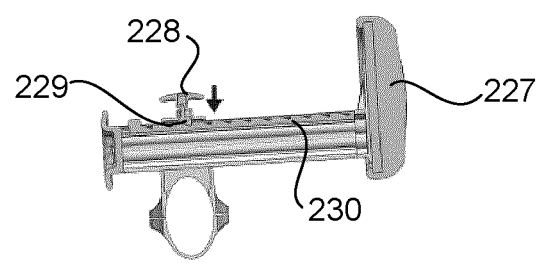

Now looking at FIGS. 21a-d, there is shown a retractable shin pad assembly 220. Shin pad mount 222 is fixedly secured to base 172, and includes an orifice 224 defined therein for receiving toothed retracting member 226 having shin pad 227 at one end. Shin pad mount 222 also includes locking knob 228 with pawl 229, which is resiliently biased to engage teeth 230 of toothed retracting member 226, thereby placing and maintaining shin pad 227 at a desired distance for engaging a patient, as shown in FIG. 21b. In FIG. 21c, there is shown locking knob 228 forced upwards to disengage pawl 229 from toothed retracting member 226 to allow sliding of toothed retracting member 226 within orifice 224. Once the desired distance of shin pad 227 is chosen locking knob 228 is forced downwards and pawl 229 engages a tooth 230 of toothed retracting member 226, to maintain toothed retracting member 226 in place.

Figure 22A:
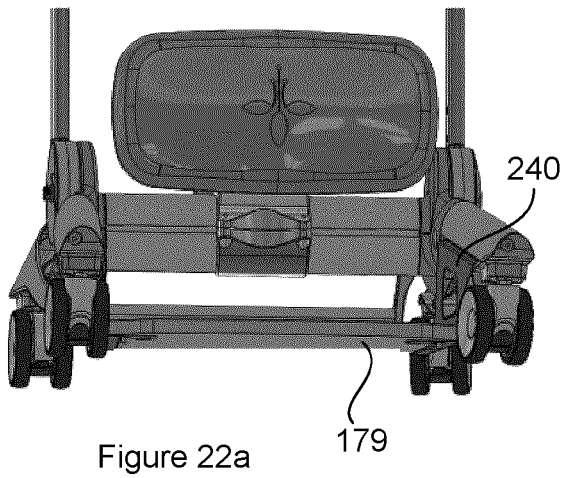
FIGS. 22a-e show views of a platform.
Figure 22B:
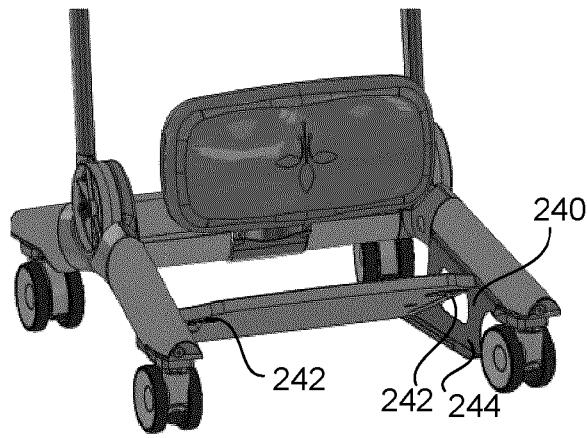
Figure 22C:
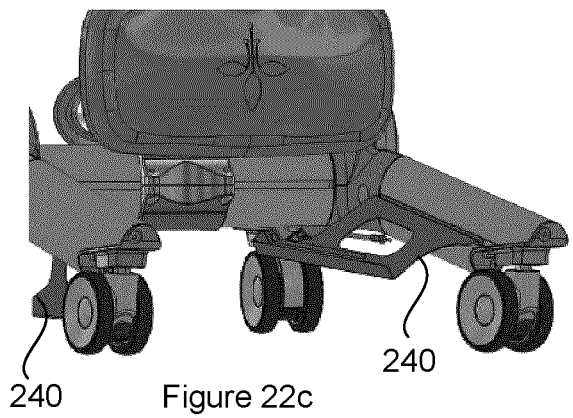
Figure 22D:
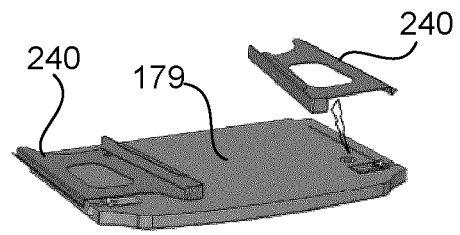
Figure 22E:
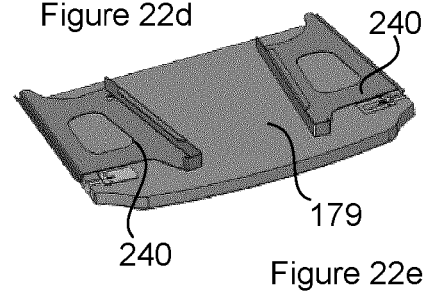

As described above, platform 179 of base 172 may be removed to allow a patient to use apparatus 145 as an ambulatory device. As shown in FIGS. 22a-e, platform 179 rests on a pair of brackets 240 which are removably secured to base 172. Platform 179 comprises latches 242 which are slidable to engage appropriately dimensioned slots 244 in brackets 240. Accordingly, platform 179 can be removed from brackets 240 by disengaging latches 242 from slots 244, as shown in FIG. 22b. Brackets 240 are removed from base 172 by unhooking brackets from base 172, as shown in FIG. 22c. To facilitate storage brackets 240 are secured to platform 179 via an attachment means, such as via a magnet, as shown in FIG. 22e.

Figure 23:
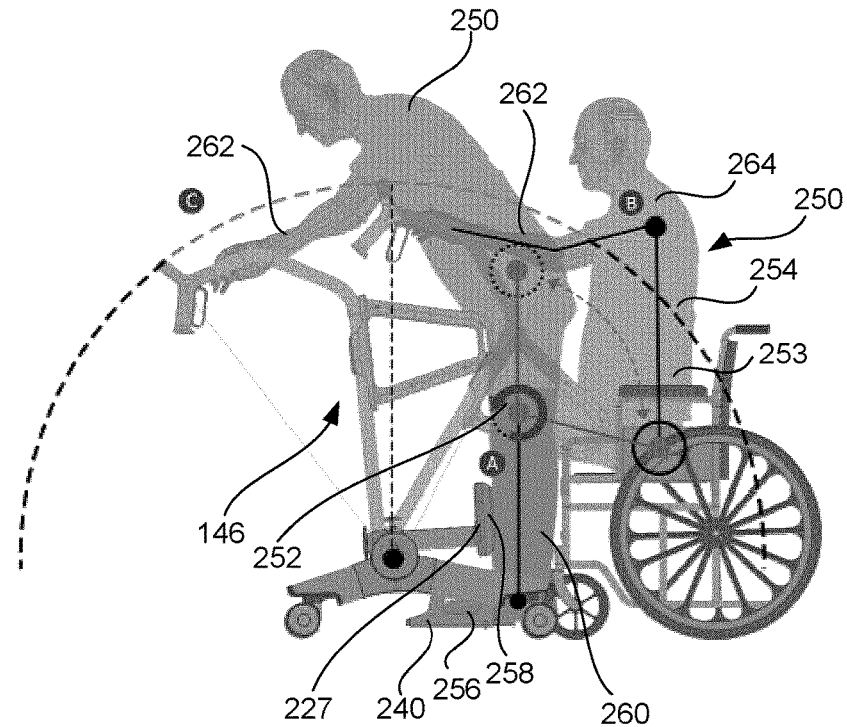
FIG. 23 shows a view of the mobility apparatus in use.

FIG. 23 shows the basic ergonomics principle behind apparatuses 10 and 145. Patient 250 starts in a seated position, and apparatus 145 is positioned such that a fixed pivot point (A) is created around the knees 252 of patient 250 in order to allow the mid-section 253 of the body 254 to rotate on this point (A). Accordingly, feet 256 of patient 250 are placed on platform 179, and shin pad assembly 220 is adjusted such that shins 258 of patient 250 abut shin pad 227, thereby locking legs 260 to allow knees 252 to become the pivot point (A). Locking legs 260 also minimizes movement during the lifting process. Next, arms 262 of patient 250 are fully extended to grasp one of the handlebar grips 158, 160 or 162, and connect upper body 264 of patient 250 to apparatus 145. With such a configuration achieved, the overall distance handle assembly 146 travels is limited and therefore all the efforts provided by the caregiver during the lifting process needs to be transferred into moving body 254 forward rather than just pulling on arms 262. Therefore, having arms 262 extended allows upper body 264 to become one fixed unit (B).

The overall shape and form of apparatuses 10 and 145 is designed to accommodate these principles. Apparatuses 10 and 145 are designed to allow the caregivers to bring apparatuses 10 and 145 as close to patient 250 as possible while at the same time allowing patient 250 to reach for handlebar grips 158, 160 or 162, and fully extend their arms 262. Accordingly, the shape of handle assembly 146 facilitates lifting of patient 250. The distance that handle assembly 146 travels (path C) matches the overall distance body 255 needs to travel in order to fold up on the fixed pivot point (A). Therefore, angle of rotation φ can be adjusted such handle assembly 146 provide a suitable travel distance such that body 255 has enough space to fully fold up, and vice versa when lowering a patient.

Figures 24A, 24B, 24C:
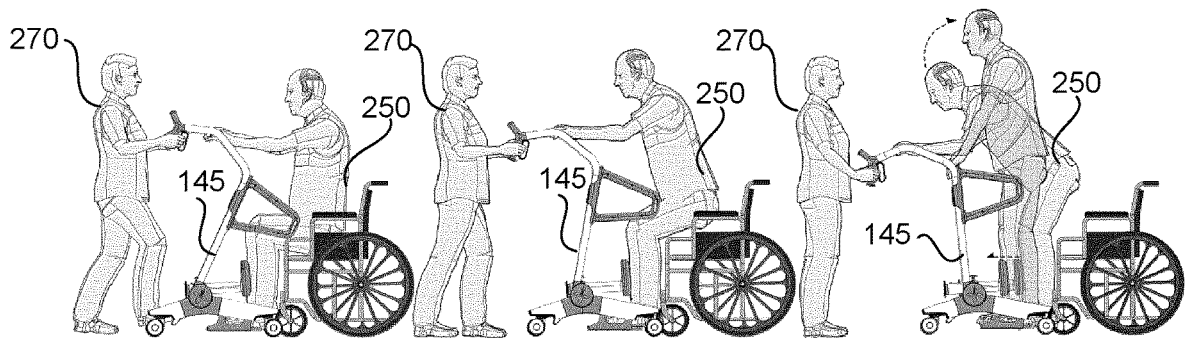
FIGS. 24a to 24c show the mobility apparatus in use for transferring an individual from an initial seated position to a standing position.

FIGS. 24a to 24c show the method steps for transferring a patient 250 from an initial seated position to a standing position, with the assistance of caregiver 270.

Benefits, other advantages, and solutions to problems have been described above with regard to specific exemplary implementations. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or device that comprises a list of elements does not include only those elements but may include other elements not expressly listed or inherent to such process, method, article, or device. Further, no element described herein is required for the practice of the invention unless expressly described as "essential" or "critical."

The preceding detailed description of exemplary implementations of the invention makes reference to the accompanying drawings, which show the exemplary implementation by way of illustration. While these exemplary implementations are described in sufficient detail to enable those skilled in the art to practice the invention, it should be understood that other exemplary implementations may be realized and that logical and mechanical changes may be made without departing from the spirit and scope of the invention. For example, the steps recited in any of the method or process claims may be executed in any order and are not limited to the order presented. Thus, the preceding detailed description is presented for purposes of illustration only and not of limitation, and the scope of the invention is defined by the preceding description, and with respect to the attached claims.

The invention claimed is:

1. A mobility apparatus having:
    a base having casters;
    a handle assembly;
    a locking mechanism operable to place the handle assembly into a plurality of positions corresponding to an operating mode of the apparatus, and maintain the handle assembly in one of the plurality of positions;
    wherein the locking mechanism comprises:
        a hub fixedly secured to the base, the hub comprising attachment means for the handle assembly;
        a hub ring rotatably secured within the hub;
        a biased sliding lock pin;
        a lock track comprising a plurality of detent positions engageable by the biased sliding lock pin to place the handle assembly into the plurality of positions, and maintain the handle assembly in one of the plurality of positions;
        a gas spring mechanism coupled to the hub ring;
    an actuating mechanism comprising a hand-operated lever coupled to the biased sliding lock pin and operable to cause the biased sliding lock pin to engage and disengage the plurality of detent positions; and
    a braking mechanism for the casters, wherein the braking mechanism is operable to lock and unlock the casters simultaneously.

2. The mobility apparatus of claim 1, wherein the actuating mechanism comprises the lever coupled to a gas spring actuating cable linked to the gas spring mechanism.

3. The mobility apparatus of claim 2, wherein the actuating mechanism is coupled to the locking mechanism via a braking cable.

4. The mobility apparatus of claim 3, wherein the actuating mechanism comprises the grip handle and the lever coupled to the gas spring actuating cable linked to the gas spring mechanism.

5. The mobility apparatus of claim 4, wherein in an actuating position the lever pulls the gas spring actuating cable and unlocks the gas spring mechanism to cause rotation of the hub ring for placement of the handle assembly in multiple operating modes.

6. The mobility apparatus of claim 5, wherein releasing the lever removes tension in the gas spring actuating cable and locks the gas spring mechanism to maintain the hub ring and handle assembly in one of the multiple operating modes.

7. The mobility apparatus of claim 1, further comprising a retractable shin pad assembly.

8. The mobility apparatus of claim 1, further comprising a platform removably secured to the base.

9. The mobility apparatus of claim 1, wherein the gas spring mechanism provides a mechanical advantage to assist an operator in lifting an individual from a seated position to a standing position.

10. The mobility apparatus of claim 1, wherein the gas spring mechanism provides a controlled and dampened movement of the handle assembly to assist an operator in transferring an individual from a standing position to a seated position.

11. A method of transferring an individual from a seated position to a standing position, the method having the steps of:
   providing a mobility apparatus having:
      a base;
      a handle assembly pivotally attached to the base;
      a locking mechanism operable to place the handle assembly into a plurality of positions corresponding to an operating mode of the apparatus, and maintain the handle assembly in one of the plurality of positions;
      wherein the locking mechanism comprises:
         a hub fixedly secured to the base, the hub comprising attachment means for the handle assembly;
         a hub ring rotatably secured within the hub;
         a biased sliding lock pin;
         a lock track comprising a plurality of detent positions engageable by the biased sliding lock pin to place the handle assembly into the plurality of positions, and maintain the handle assembly in one of the plurality of positions;
         an actuating mechanism comprising a hand-operated lever coupled to the biased sliding lock pin and operable to cause the biased sliding lock pin to engage and disengage the plurality of detent positions; and
         a gas spring mechanism coupled to the hub ring to provide a mechanical advantage to assist an operator in lifting the individual from the seated position to the standing position;
   positioning the individual in front of the apparatus to grasp the handle assembly while seated; and
   pulling the individual from the seated position to the standing position by pulling on the handle assembly to lift the individual along a predetermined upward arc.

12. The method of claim 11, wherein the plurality of positions correspond to one of a collapsed mode, a loading mode and a transfer mode.

13. The method of claim 11, wherein the handle assembly is pivoted at an operating angle φ towards the individual in the seated position with a fixed pivot point formed at the individual's knees.

14. The method of claim 13, wherein the individual is able to reach and grasp at least one handle bar associated with the handle assembly by substantially extending the individual's arms.

15. The method of claim 14, wherein the individual's body straightens up about the fixed pivot point as the handle assembly is pivoted away from the individual to travel through the operating angle φ to place the individual in the standing position.

16. A method of transferring an individual from a standing position to a seated position, the method having the steps of:
   providing a mobility apparatus having:
      a base;
      a handle assembly pivotally attached to the base;
      a locking mechanism operable to place the handle assembly into a plurality of positions corresponding to an operating mode of the apparatus, and maintain the handle assembly in one of the plurality of positions;
      wherein the locking mechanism comprises:
         a hub fixedly secured to the base, the hub comprising attachment means for the handle assembly;
         a hub ring rotatably secured within the hub;
         a biased sliding lock pin;
         a lock track comprising a plurality of detent positions engageable by the biased sliding lock pin to place the handle assembly into the plurality of positions, and maintain the handle assembly in one of the plurality of positions;
         a gas spring mechanism coupled to the hub ring to provide a controlled and dampened movement of the handle assembly to assist an operator in transferring the individual from the standing position to the seated position;
      positioning the individual in front of the apparatus to grasp the handle assembly while standing;
      an actuating mechanism comprising a hand-operated lever coupled to the biased sliding lock pin and operable to cause the biased sliding lock pin to engage and disengage the plurality of detent positions; and
   forcing the individual from the standing position to the seated position by applying a force on the handle assembly to lower the individual along a predetermined downward arc to the seated position.

17. The method of claim 16, wherein the individual's body folds up about a fixed pivot point as the handle assembly is towards the individual to travel through the operating angle φ to place the individual in the seated position, wherein the fixed pivot point is formed at the individual's knees.

18. The method of claim 17, wherein the individual is able to maintain the reach and grasp of at least one handle bar associated with the handle assembly from the standing position to the seated position by substantially extending the individual's arms.

19. The method of claim 16, wherein the plurality of positions correspond to one of a collapsed mode, a loading mode and a transfer mode.

* * * * *